United States Patent
Maeda et al.

(10) Patent No.: US 6,968,088 B2
(45) Date of Patent: Nov. 22, 2005

(54) MODIFICATION OF DETECTED QUANTIZATION STEP SIZE FROM THE ENCODED BITSTREAM BASED ON A REGION OF INTEREST (ROI) BITMASK

(75) Inventors: Mitsuru Maeda, Tokyo (JP); Tadashi Ohira, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 682 days.

(21) Appl. No.: 09/816,119

(22) Filed: Mar. 26, 2001

(65) Prior Publication Data
US 2002/0018598 A1 Feb. 14, 2002

(30) Foreign Application Priority Data

Mar. 28, 2000 (JP) .......................... 2000-089306
Apr. 28, 2000 (JP) .......................... 2000-131282

(51) Int. Cl.[7] .............................................. G06K 9/36
(52) U.S. Cl. .............................. 382/239; 382/240
(58) Field of Search ................................ 382/232, 239, 382/240, 243, 251, 286; 375/240.02, 240.05, 240.03, 240.07, 240.19, 240.24

(56) References Cited

U.S. PATENT DOCUMENTS

| | | | |
|---|---|---|---|
| 4,974,071 A | 11/1990 | Maeda | 358/539 |
| 5,359,438 A | 10/1994 | Maeda | 358/539 |
| 5,371,606 A | 12/1994 | Katayama et al. | 358/400 |
| 5,521,717 A | 5/1996 | Maeda | 382/240 |
| 5,825,927 A * | 10/1998 | Boyce et al. | 382/232 |
| 5,933,249 A | 8/1999 | Shimura et al. | 382/239 |
| 6,067,382 A | 5/2000 | Maeda | 382/239 |
| 6,477,201 B1 * | 11/2002 | Wine et al. | 375/240.08 |
| 6,804,405 B2 * | 10/2004 | Christopoulos et al. | 382/243 |

OTHER PUBLICATIONS

H. Toda, "Special Report JPEG2000 Explore Next Generation Image Technique", C Magazine, Nov. 1999, pp. 6–10.

\* cited by examiner

*Primary Examiner*—Yon J. Couso
(74) *Attorney, Agent, or Firm*—Fitzpatrick, Cella, Harper & Scinto

(57) ABSTRACT

An image processing apparatus for encoding an image which contains a region to be encoded to have higher image quality than the surrounding portions, has detection means (100) for detecting a quantization step from a bitstream of the image encoded in a first stage, quantization step control means (103) for controlling the detected quantization step, and selection means (102) for encoding the image in a second stage using the controlled quantization step, and selecting one of the images encoded in the first and second stages.

7 Claims, 24 Drawing Sheets

MODIFICATION OF DETECTED QUANTIZATION STEP SIZE FROM THE ENCODED BITSTREAM BASED ON A REGION OF INTEREST (ROI) BITMASK

FIELD OF THE INVENTION

The present invention relates to an image processing apparatus and method for encoding/decoding an image, and a computer readable memory.

BACKGROUND OF THE INVENTION

As a still image encoding scheme, JPEG is currently prevalent. JPEG was standardized by ISO (International Organization for Standardization). As a moving image encoding scheme, Motion JPEG that exploits JPEG as intra-frame coding is known. Furthermore, as the Internet proliferates, coding that can assure higher functions and higher image quality than JPEG used so far is demanded. For this reason, ISO is laying down new still image coding standards. This activity is generally called "JPEG2000". Refer to Toda, "Special Report JPEG2000 Explore Next Generation Image Technique", *C MAGAZINE* November 1999, pp. 6–10, for an outline of JPEG2000. A region ROI (Region of Interest) to be decoded to have higher image quality than surrounding portions is a new function, and is a helpful technique.

However, in a conventional image encoding/decoding apparatus (details will be described later), for example, when a communication line of a network having a low capacity is used, only a portion of the ROI is transported, and information other than the ROI is not transported at all. This is because the ROI has undergone a bit shift-up process to prevent bit planes from overlapping upon decoding inside and outside the ROI region, and if all bits of the ROI are not decoded, other bits cannot be decoded at all.

When JPEG2000 is applied as intra-frame coding to moving image coding, rate control is required, and the number of bit planes that can be transported may vary depending on patterns upon adjusting the code size. That is, the ROI and other regions can be reproduced in one frame, but only the ROI is reproduced and other regions are reproduced black in another frame. Furthermore, since different phenomena take place in units of frames, the reproduced image is disturbed considerably.

For example, upon encoding three successive frames, if the ROI and other regions can be encoded/decoded in an intermediate frame alone, as shown in FIGS. 18A to 18C, regions (background) other than the ROI in the frames shown in FIGS. 18A and 18C before and after the frame in FIG. 18B are not decoded, thus causing annoyance to the user.

The present invention has been made in consideration of the above problems, and has as its object to provide an image processing apparatus and method, that can satisfactorily encode and decode the ROI and other regions, and a computer readable memory.

SUMMARY OF THE INVENTION

In order to achieve the above object, for example, an image processing apparatus of the present invention comprises the following arrangement.

An image processing apparatus for encoding an image which contains a region to be encoded to have higher image quality than surrounding portions, comprises:

detection means for detecting a quantization step from a bitstream of the image encoded in a first stage;

quantization step control means for controlling the detected quantization step; and selection means for encoding the image in a second stage using the controlled quantization step, and selecting one of the images encoded in the first and second stages.

In order to achieve the above object, for example, an image processing apparatus of the present invention comprises the following arrangement.

An image processing apparatus for encoding an image which contains a region to be encoded to have higher image quality than surrounding portions, comprises:

computation means for computing an index using an area of the image and an area of the region; and quantization step control means for controlling a quantization step using the index.

In order to achieve the above object, for example, an image processing apparatus of the present invention comprises the following arrangement.

An image processing apparatus for encoding input image data, comprises:

determination means for determining a high image quality encoding region in the image data, which is to be encoded to have higher image quality than surrounding regions;

transformation means for generating transformation data by computing orthogonal transforms of the image data;

filling means for shifting the transformation data in the high image quality encoding region to an MSB side, filling "0" in lower bits obtained as a result of the bit shift process, and filling "0" in upper bits of the transformation data outside the high image quality encoding region;

encoding means for encoding bit planes that form the transformation data;

designation means for designating an order in which bit plane encoded data obtained by the encoding means is to be output; and output means for outputting the bit plane encoded data on the basis of the output order designated by the designation means.

In order to achieve the above object, for example, an image processing apparatus of the present invention comprises the following arrangement.

An image processing apparatus for decoding input image data, comprises:

input means for inputting encoded data which has a high image quality encoding region which has been encoded to have higher image quality than surrounding regions, and contains output order encoded data that designates an order in which bit plane encoded data that form the encoded data is to be output;

storage means for storing the bit plane encoded data which form the encoded data on the basis of the output order encoded data;

bit shift means for shifting bits of the encoded data stored in the storage means;

decoding means for decoding the encoded data whose bits have been shifted by the bit shift means; and inverse transformation means for generating image data by computing inverse orthogonal transforms of data decoded by the decoding means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

A conventional image encoding apparatus that implements ROI will be explained first using FIG. 12.

Figure 12:
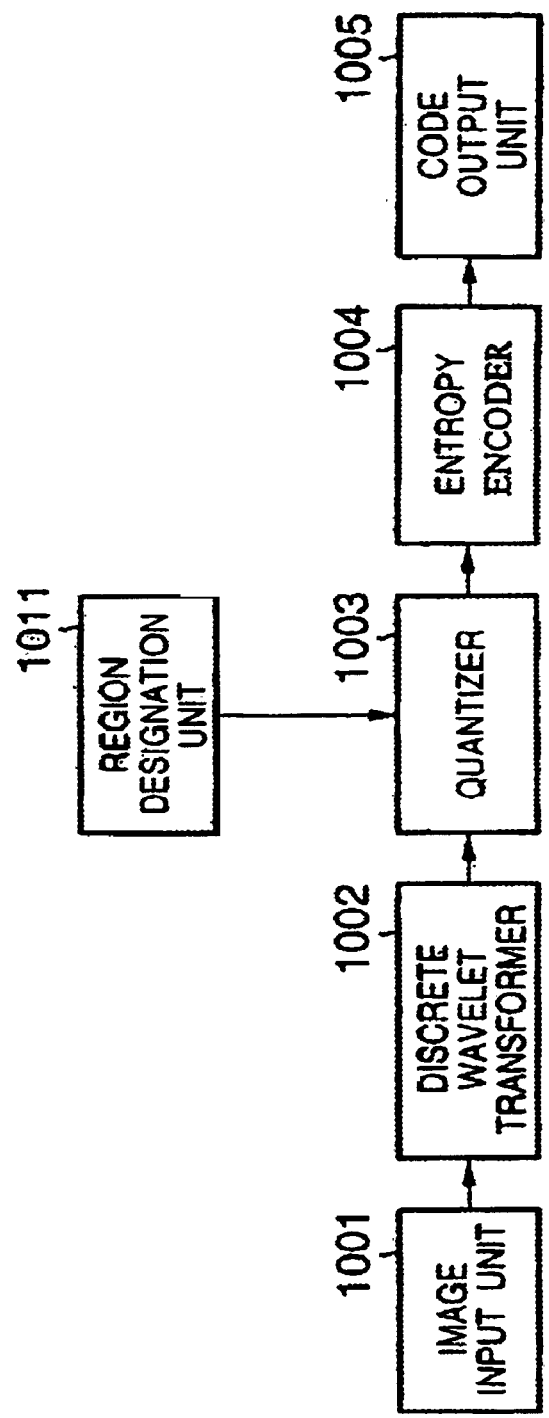
FIG. 12 is a block diagram showing a basic arrangement of a conventional image encoding apparatus that implements ROI.

FIG. 12 is a block diagram showing the basic arrangement of a conventional image encoding apparatus that implements ROI.

Referring to FIG. 12, reference numeral 1001 denotes an image input unit; 1002, a discrete wavelet transformer; 1003, a quantizer; 1004, an entropy encoder; 1005, a code output unit; and 1011, a region designation unit.

Pixel signal that form an image signal to be encoded is input to the image input unit 1001 in a raster scan order. The image signal output from the image input unit 1001 is input to the discrete wavelet transformer 1002. The discrete wavelet transformer 1002 executes a two-dimensional wavelet transformation process of the input image signal, and computes and outputs transform coefficients.

An example of the configuration of transform coefficient groups of two levels obtained by the two-dimensional discrete wavelet transformation process will be explained below with reference to FIG. 13.

Figure 13:
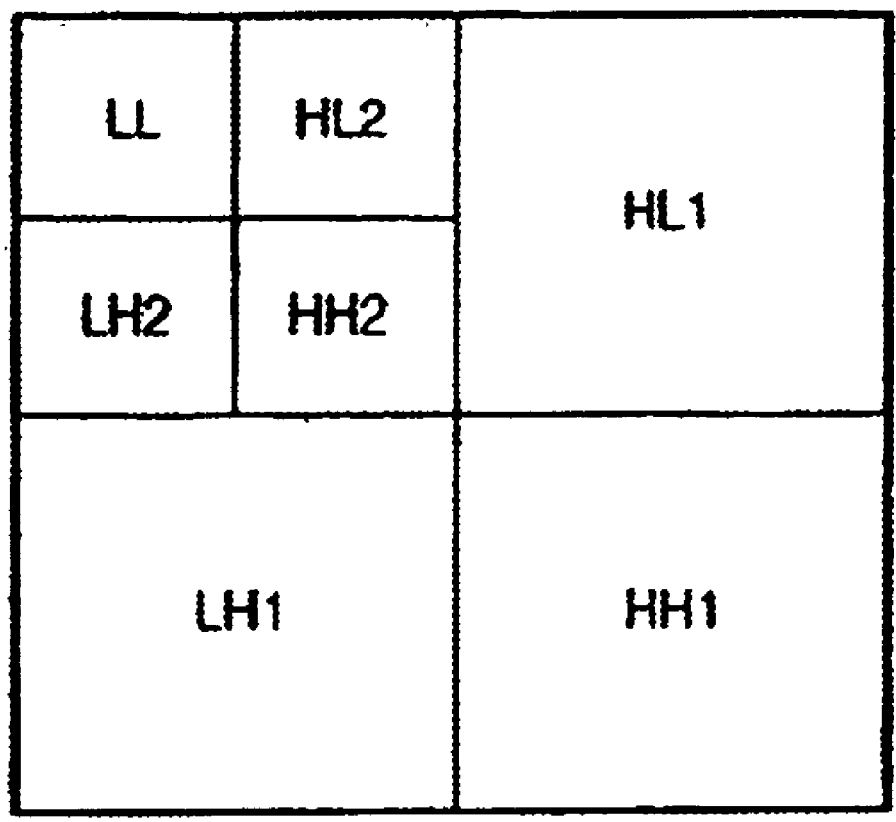
FIG. 13 shows an example of a configuration of subbands of transform coefficient groups of two levels obtained by a two-dimensional discrete wavelet transformation process.

FIG. 13 shows an example of a configuration of transform coefficient groups of two levels obtained by the two-dimensional discrete wavelet transformation process.

Referring to FIG. 13, an image signal is decomposed into coefficient sequences HH1, HL1, LH1, . . . , LL in different frequency bands. Note that these coefficient sequences will be referred to as subbands hereinafter. The coefficients of the individual subbands are output to the quantizer 1003.

The region designation unit 1011 determines a region (ROI) to be decoded to have higher image quality than the surrounding portions of an image to be encoded, and generates mask information indicating pixels that belong to the ROI upon computing the discrete wavelet transforms of the image to be encoded.

The mask information generation process will be explained below using FIGS. 14A and 14B.

Figure 14A:
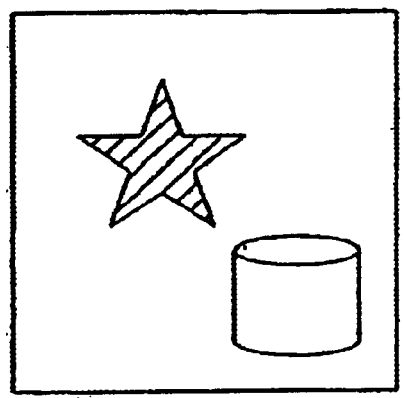
FIGS. 14A and 14B show processes of generating mask information.

When a star-shaped region as shown in FIG. 14A is designated in an image by a predetermined instruction input, the region designation unit 1011 computes those portions of respective subbands that include the designated region when computing the discrete wavelet transforms of the image including this designated region. The region indicated by this mask information corresponds to a range including transform coefficients of the surrounding region required for reconstructing an image signal on the boundary of the designated region.

Figure 14B:
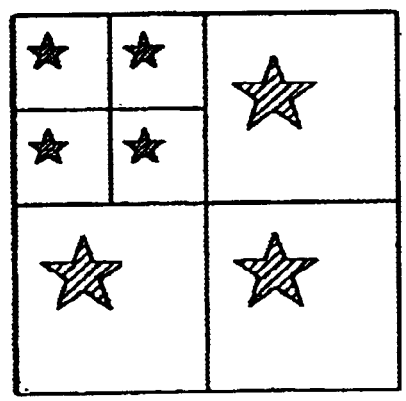

FIG. 14B shows an example of the mask information computed in this way. In this example, mask information of two-dimensional discrete wavelet transformation of the image in FIG. 14A is computed, as shown in FIG. 14B. In FIG. 14B, a star-shaped portion corresponds to the designated region, bits of the mask information in this designated region are set to "1", and other bits of the mask information are set to "0". Since the entire mask information has the same format as transform coefficients of two-dimensional discrete wavelet transformation, whether or not a transform coefficient at a given position belongs to the designated region can be identified by checking the corresponding bit in the mask information. The mask information generated in this manner is output to the quantizer 1003.

The quantizer 1003 quantizes the input coefficients by a predetermined quantization step Δ, and outputs indices corresponding to the quantized values. The quantizer 1003 changes quantization indices based on the mask information input from the region designation unit 1011 by:

$$q' = q \times 2^8; \text{ inside region} \tag{1}$$

$$q' = q; \text{ outside region} \tag{2}$$

With the aforementioned process, only quantization indices that belong to the designated region designated by the region designation unit 1011 are shifted to the MSB side by 8 bits.

The shift-up process of quantization indices will be described below using FIGS. 15A and 15B.

Figure 15A:
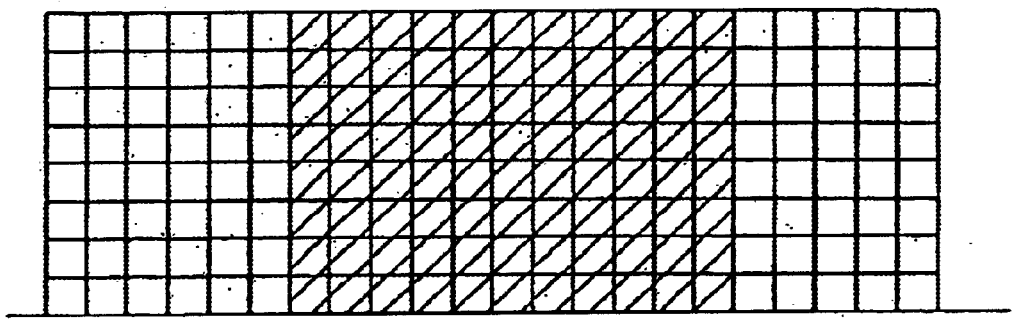
FIGS. 15A and 15B show shift-up processes of quantization indices.
Figure 15B:
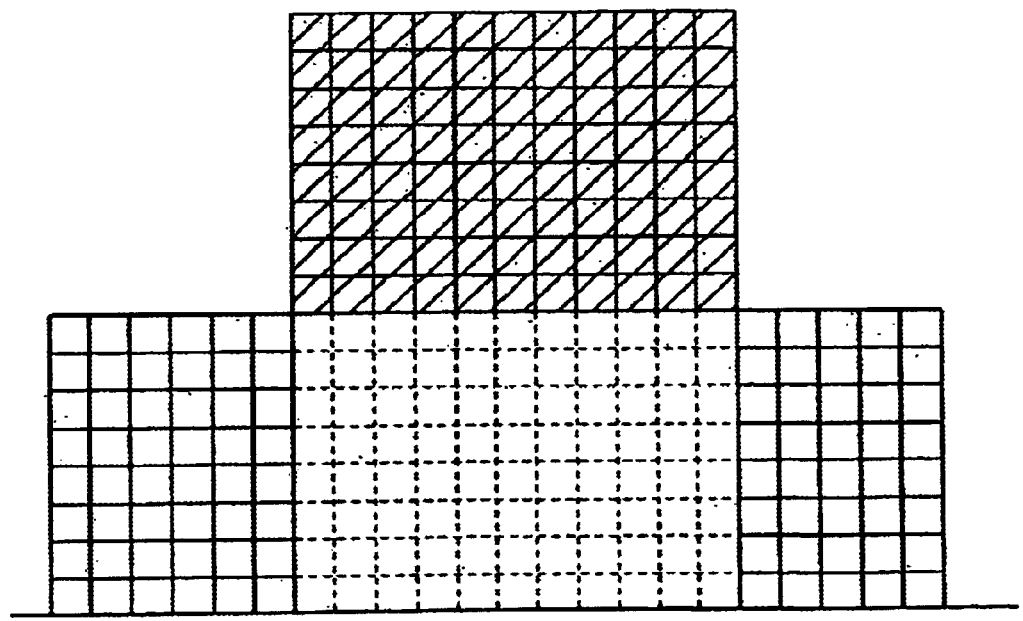

FIG. 15A shows quantization indices of given subbands, and FIG. 15B shows quantization indices after the shift process. The quantization indices that have undergone the shift-up process are output to the entropy encoder 1004.

The entropy encoder 1004 decomposes the input quantization indices into bit planes, executes binary arithmetic coding in units of bit planes, and outputs code streams.

The operation of the entropy encoder 1004 will be described below using FIGS. 16A and 16B.

Figure 16A:
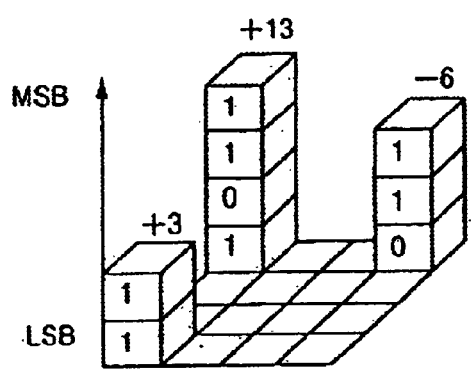
FIGS. 16A and 16B show the operation of an entropy encoder.
Figure 16B:
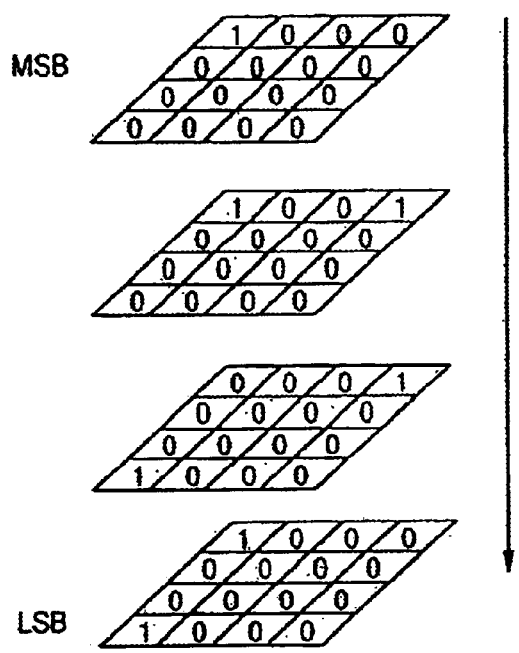

FIGS. 16A and 16B show the operation of the entropy encoder.

In this example, a 4×4 subband region includes three nonzero indices, which respectively have values "+13", "−6", and "+3". The entropy encoder 1004 scans this region to obtain a maximum value M, and computes the required number S of bits.

In FIG. 16A, since the maximum coefficient value M is "13", the number S of bits required for expressing this value is "4". Sixteen quantization indices in the sequence are processed in units of four bit planes, as shown in FIG. 16B. The entropy encoder 1004 performs binary arithmetic coding of bits of the most significant bit plane (indicated by MSB in FIG. 16B) first, and outputs the coding result as a bitstream. Then, the encoder 1004 lowers the bit plane by one level, and encodes and outputs bits of each bit plane to the code output unit 1005 until the bit plane of interest reaches the least significant bit plane (indicated by LSB in FIG. 16B). At this time, a code of each quantization index is entropy-encoded immediately after the first nonzero bit is detected upon scanning the bit plane. Also, in entropy encoding, the code length can be adjusted by aborting encoding at an appropriate bit plane.

An image decoding apparatus for decoding the bitstream obtained by the aforementioned image encoding apparatus will be explained below using FIG. 17.

Figure 17:
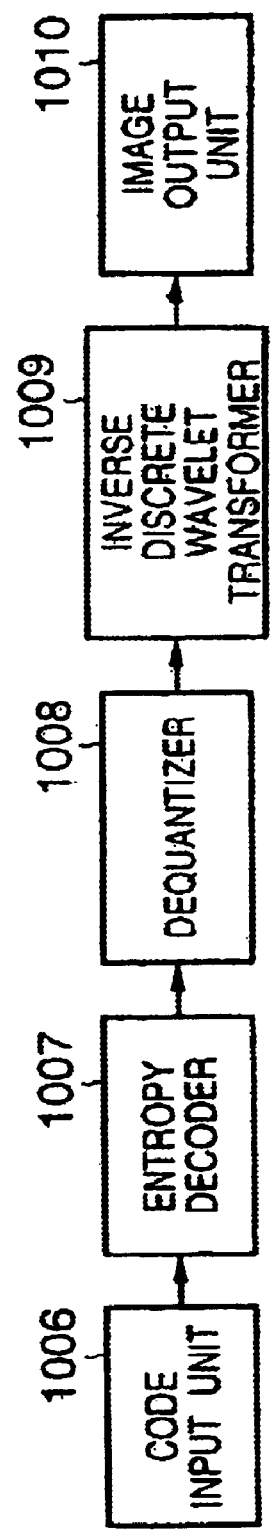
FIG. 17 is a block diagram showing an arrangement of a conventional image decoding apparatus.
Figure 18A:
FIGS. 18A to 18C are views for explaining image deterioration resulting from a conventional process.
Figure 18B:
Figure 18C:

FIG. 17 is a block diagram showing the basic arrangement of a conventional image decoding apparatus.

Reference numeral 1006 denotes a code input unit; 1007, an entropy decoder; 1008, a dequantizer; 1009, an inverse discrete wavelet transformer; and 1010, an image output unit.

The code input unit 1006 receives a bitstream from the image encoding apparatus, and outputs the input bitstream to the entropy decoder 1007. The entropy decoder 1007 decodes and outputs the input bitstreams in units of bit planes. The entropy decoder 1007 sequentially decodes one subband region to be decoded in units of bit planes to finally restore quantization indices. The restored quantization indices are output to the dequantizer 1008 which reclaims transform coefficients c' from the input quantization indices by:

$$c' = \Delta \times q'/2^8; \text{ inside region} \tag{3}$$

$$c' = \Delta \times q'; \text{ outside region} \tag{4}$$

where q' is the quantization index, and Δ is the quantization step, which is the same value used when encoding. c' is the restored transform coefficient, which is output to the inverse discrete wavelet transformer 1009, and undergoes inverse discrete wavelet transformation to reclaim image data.

Preferred embodiments of the present invention will be described in detail using the accompanying drawings.

[First Embodiment]

Figure 20:
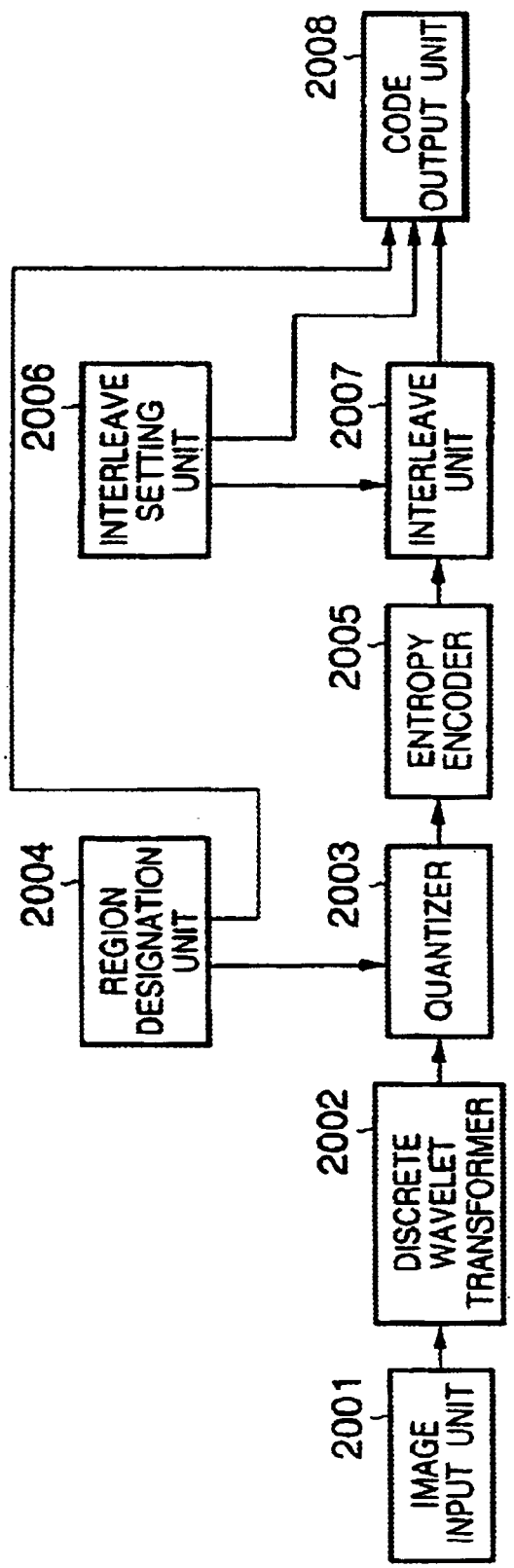
FIG. 20 is a block diagram showing an arrangement of an image processing apparatus according to the first embodiment of the present invention.

FIG. 20 is a block diagram showing an arrangement of an image processing apparatus according to this embodiment of the present invention.

Note that this embodiment will exemplify an image encoding apparatus.

Referring to FIG. 20, reference numeral 2001 denotes an image input unit; 2002, a discrete wavelet transformer; 2003, a quantizer; 2004, a region designation unit; 2005, an entropy encoder; and 2008, a code output unit. Reference numeral 2006 denotes an interleave setting unit, which determines the order in which encoded data of each bit plane are output, and encodes that contents. Reference numeral 2007 denotes an interleave unit which forms a bitstream in accordance with the output order output from the interleave setting unit 2006.

In this arrangement, the image input unit 2001 receives pixel signals which form an image signal to be encoded in the raster scan order. The image signal output from the image input unit 2001 is input to the discrete wavelet transformer 2002. The discrete wavelet transformer 2002 executes a two-dimensional discrete wavelet transformation process of the input image signal to compute and output transform coefficients. The transform coefficients are output to the quantizer 2003.

The region designation unit 2004 determines an ROI in the image signal to be encoded, and generates mask information indicating transform coefficients that belong to the ROI upon computing the discrete wavelet transforms of the image to be encoded. The region designation unit 2004 also computes those portions of respective subbands which include the ROI upon computing the wavelet transforms of the image including the ROI are computed. The mask information is encoded, and the encoded information is sent to the code output unit 2008.

The mask information generated in this way is output to the quantizer 2003. The quantizer 2003 quantizes the input transform coefficients by a predetermined quantization step, and outputs quantization indices corresponding to the quantized values. The quantizer 2003 changes quantization indices using equations (1) and (2) on the basis of the mask information input from the region designation unit 2004. Hence, only quantization indices that belong to the ROI (spatial region) designated by the region designation unit 2004 are shifted to the MSB side by 8 bits.

The quantization index shift-up process will be explained below using FIGS. 2A to 2C.

Figure 2A:
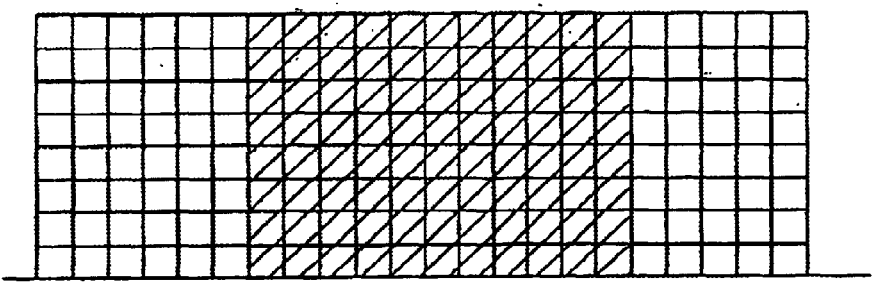
FIGS. 2A to 2C are views for explaining a bit shift process of quantization indices.

FIG. 2A shows quantization indices, and the central hatched portion indicates the ROI. FIG. 2B shows a state wherein the ROI is shifted to the MSB side by 8 bits. FIG.

2C shows a state wherein dotted frame boxes are filled with "0". The most significant bit plane number is "15", and the least significant bit plane number is "00". The quantization indices that have undergone the shift-up process are output to the entropy encoder 2005.

The entropy encoder 2005 decomposes the input quantization indices into bit planes, executes binary arithmetic coding in units of bit planes, and outputs code streams in units of bit planes.

The interleave setting unit 2006 sets the output order used to rearrange data of the encoded bit planes. The interleave setting unit 2006 inputs the predetermined output order of Table 1, below, to the interleave unit 2007.

TABLE 1

| Output Order | Bit Plane Number |
|---|---|
| 1 | 15 |
| 2 | 14 |
| 3 | 13 |
| 4 | 12 |
| 5 | 07 |
| 6 | 06 |
| 7 | 11 |
| 8 | 10 |
| 9 | 09 |
| 10 | 05 |
| 11 | 04 |
| 12 | 08 |
| 13 | 03 |
| 14 | 02 |
| 15 | 01 |
| 16 | 00 |

The interleave setting unit 2006 generates bit plane number codes used to append bit plane numbers to the code streams of the individual bit planes, and inputs them to the code output unit 2008.

The interleave unit 2007 outputs the code streams from the entropy encoder 2005 to the code output unit 2008 in accordance with the input output order. That is, first, the interleave unit 2007 selects the code stream of the most significant bit plane with bit plane number "15" and outputs it to the code output unit 2008. Subsequently, the interleave unit 2007 selects the code stream with bit plane number "14" and outputs it to the code output unit 2008. The interleave unit 2007 then selects the code stream with the designated bit plane number in accordance with Table 1 above, and outputs it to the code output unit 2008. The code output unit 2008 shapes the generated data in accordance with a given format, and outputs final encoded data.

Figure 8:
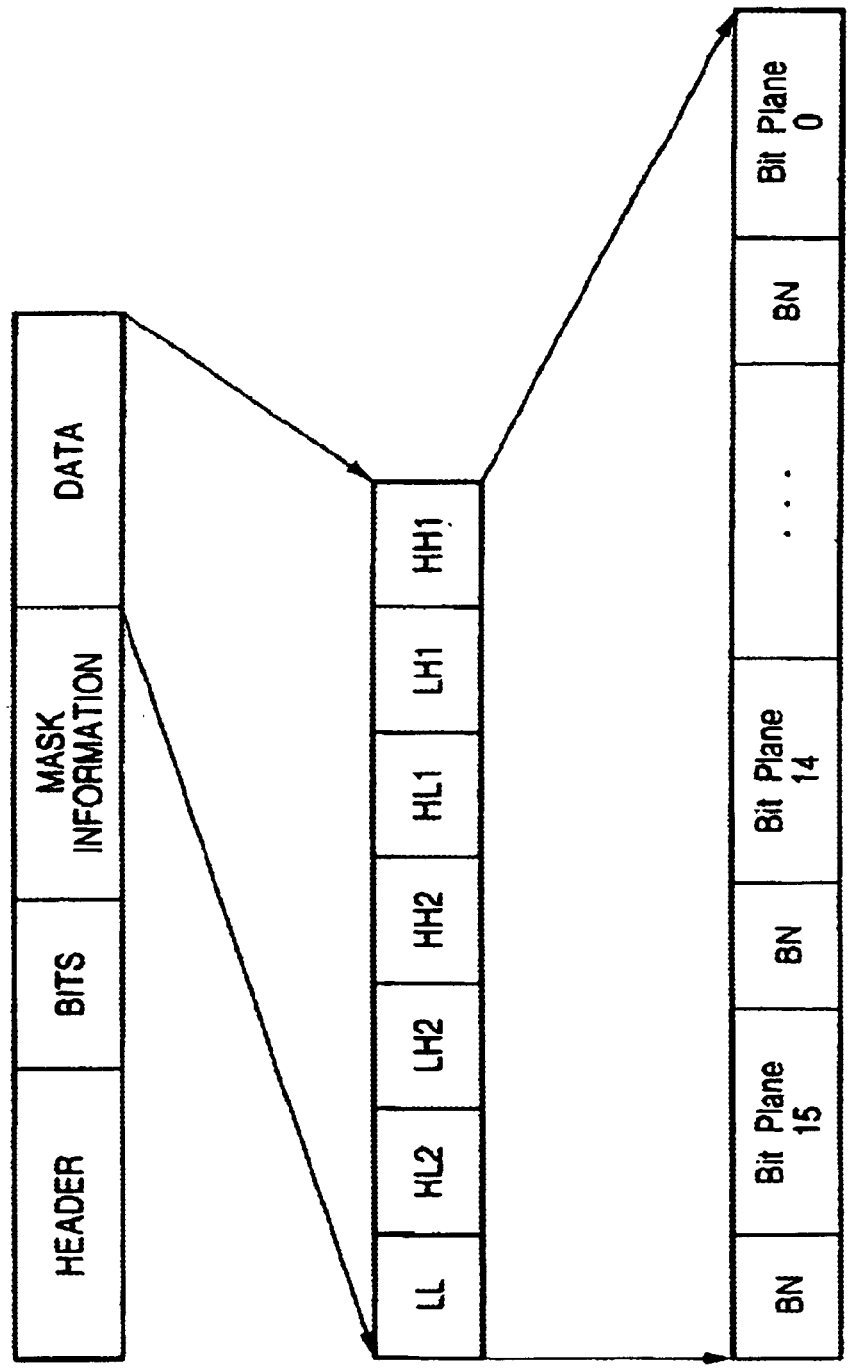
FIG. 8 shows the format of encoded data according to the first embodiment of the present invention.

The format of encoded data will be described below using FIG. 8.

Shaping of encoded data will be explained with reference to FIG. 8. The code output unit 2008 outputs a header obtained by encoding information such as an image size and the like first. Subsequently, the code output unit 2008 outputs a BITS code which indicates the number of bits per pixel of image data. The code output unit 2008 then outputs encoded data of the mask information set by the region designation unit 2004. After that, encoded data of subbands follow. The subband data are output in the order of LL, HL2, LH2, HH2, HL1, LH1, and HH1 shown in FIG. 13.

Taking LL as an example, a BN code indicating the bit plane number is output first. In case of Table 1 above, a BN code of bit plane number "15" is output. Subsequently, the code stream of bit plane number "15" encoded by the entropy encoder 2005 is output. Then, a BN code with a value "14" and the code stream of bit plane number "14" are output. After that, BN codes of bit plane numbers "13", "12", "07", "06", "11", "10", "09", "05", "04", "08", "03", "02", and "01" corresponding code streams follow, and a BN code of bit plane number "00" and corresponding code stream are output finally.

As described above, according to this embodiment, encoded data that can reconstruct not only the ROI but also the surrounding regions can be easily determined by slightly increasing the code size.

Note that this embodiment uses discrete wavelet transformation as orthogonal transformation. However, the present invention is not limited to this, and other transformation methods may be used.

In this embodiment, the interleave unit 2007 interleaves encoded data. Alternatively, the quantization results output from the quantizer 2003 may be interleaved, and the interleaved data may be encoded.

In the above description, the ROI shift-up amount is 8 bits. Alternatively, the maximum number of bits of quantization results may be used.

The apparatus of this embodiment comprises the quantizer 2003, which may be omitted depending on purposes.

[Second Embodiment]

Figure 9:
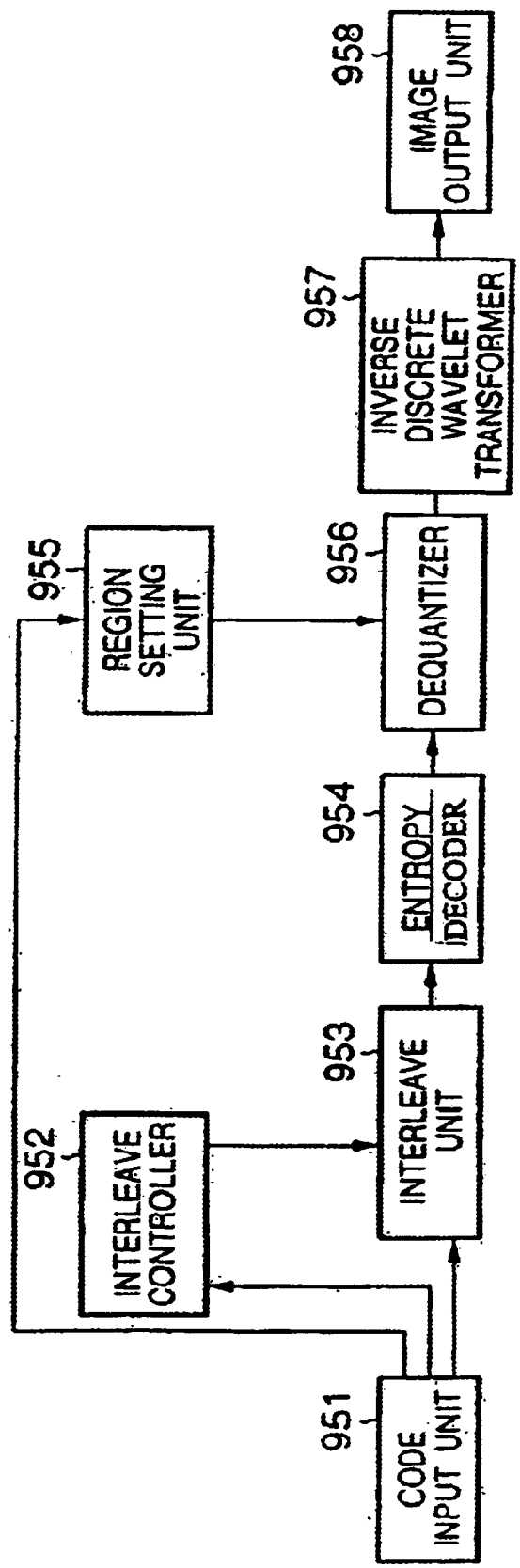
FIG. 9 is a block diagram showing an arrangement of an image processing apparatus according to the second embodiment of the present invention.

FIG. 9 is a block diagram showing the arrangement of an image processing apparatus of this embodiment. Note that this embodiment will exemplify an image decoding apparatus.

Referring to FIG. 9, reference numeral 951 denotes a code input unit; and 952, an interleave controller, which discriminates an input order of encoded data of bit planes, and performs control for reconstructing bit planes on the basis of the discrimination result. Reference numeral 953 denotes an interleave unit, which arranges bitstreams in accordance with the input order. Reference numeral 954 denotes an entropy decoder. Reference numeral 955 denotes a region setting unit which sets an ROI by decoding mask information. Reference numeral 956 denotes a dequantizer; 957, an inverse discrete wavelet transformer; and 958, an image output unit.

In this arrangement, the code input unit 951 inputs encoded data. Assume that the input code data comply with the format shown in FIG. 8. The code input unit 951 decodes a header and BITS code from the input encoded data, so that they can be used in the subsequent processes. Encoded data of mask information is input to the region setting unit 955 to restore mask information. Of the encoded data of respective bit planes, BN codes and code streams are respectively input to the interleave controller 952 and interleave unit 953.

The interleave controller 952 decodes the BN codes and inputs them to the interleave unit 953. The interleave unit 953 arranges and stores the input code streams. For example, the interleave unit 953 arranges the first code stream, second code stream, third code stream code stream, fourth code stream, fifth code stream, . . . to encoded data of the 15th bit plane, 14th bit plane, 13th bit plane, 12th bit plane, 7th bit plane, . . . in accordance with the order of Table 1. The arranged code streams are input to the entropy decoder 954.

The entropy decoder 954 decodes and outputs the code streams in units of bit planes. That is, the entropy decoder 954 sequentially decodes a given subband region to be decoded in units of bit planes to finally restore quantization indices. The restored quantization indices are output to the dequantizer 956.

The dequantizer 956 receives the data of the decoded bit planes from the entropy decoder 954.

The configuration of the bit planes will be explained below using FIGS. 10A and 10B.

Figure 10A:
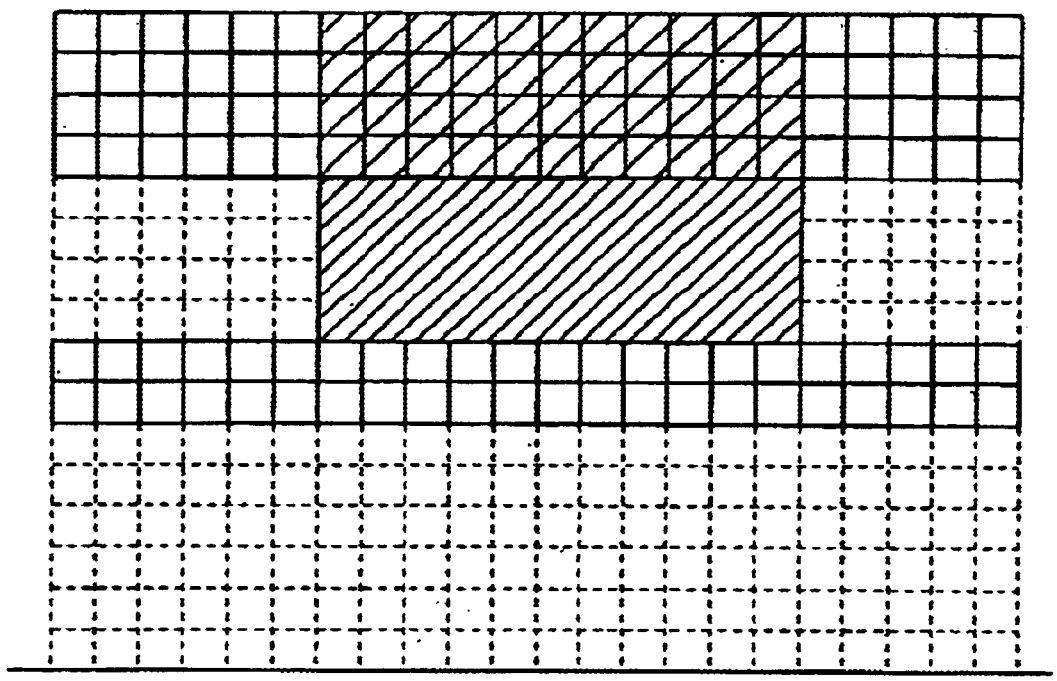
FIGS. 10A and 10B are views showing an configuration of bit planes according to the second embodiment of the present invention.
Figure 10B:
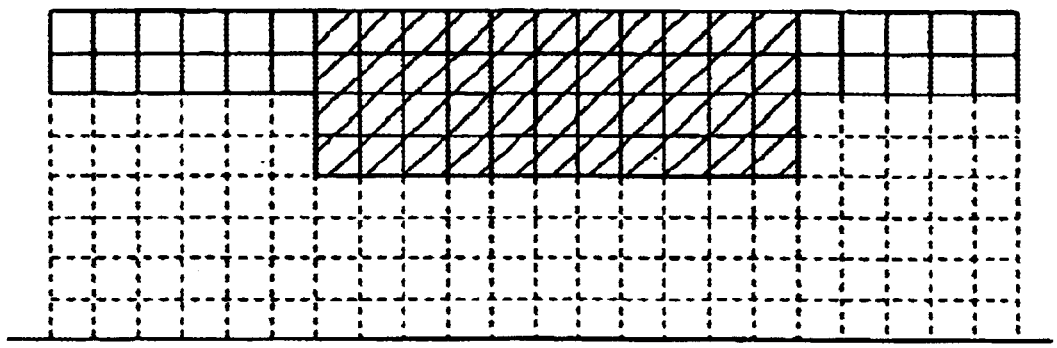

FIG. 10A shows a state wherein up to sixth bit planes have been input and decoded. The black bold frame boxes indicate decoded bits, and the hatched portions indicate bits associated with the ROI. Image reconstruction will be explained below taking as an example a case wherein up to sixth bit planes are input due to the communication line capacity, aborting at the encoding side, or the like. The ROI is dequantized according to equation (3) and is shifted 8 bits toward the LSB side. FIG. 10B shows this state, and the dotted bits in FIG. 10B indicate a value "0". Portions other than the ROI undergo normal dequantization. In this way, the dequantizer 956 reconstructs transform coefficients. The dequantizer 956 also makes the same operation when entropy decoding is complete for all bit planes.

The transform coefficients reconstructed for all subbands are output to the inverse discrete wavelet transformer 957 to compute their inverse transforms, thus reclaiming image data. The image data is output from the image output unit 958.

As described above, according to this embodiment, not only the ROI portion but also the surrounding regions can be satisfactorily restored. Also, even when decoding is aborted in the middle of the process, since not only the ROI is displayed but also minimum surrounding regions are displayed, information defects can be minimized.

Note that this embodiment uses inverse discrete wavelet transformation as inverse orthogonal transformation. However, the present invention is not limited to this, and other inverse transformation methods may be used.

In this embodiment, the interleave unit 953 interleaves encoded data. Alternatively, the interleave unit 953 may be inserted immediately before the dequantizer 956 to interleave, and the dequantizer 956 may dequantize interleaved data.

The apparatus of this embodiment comprises the dequantizer 953, which may be omitted depending on purposes.

[Third Embodiment]

Figure 11:
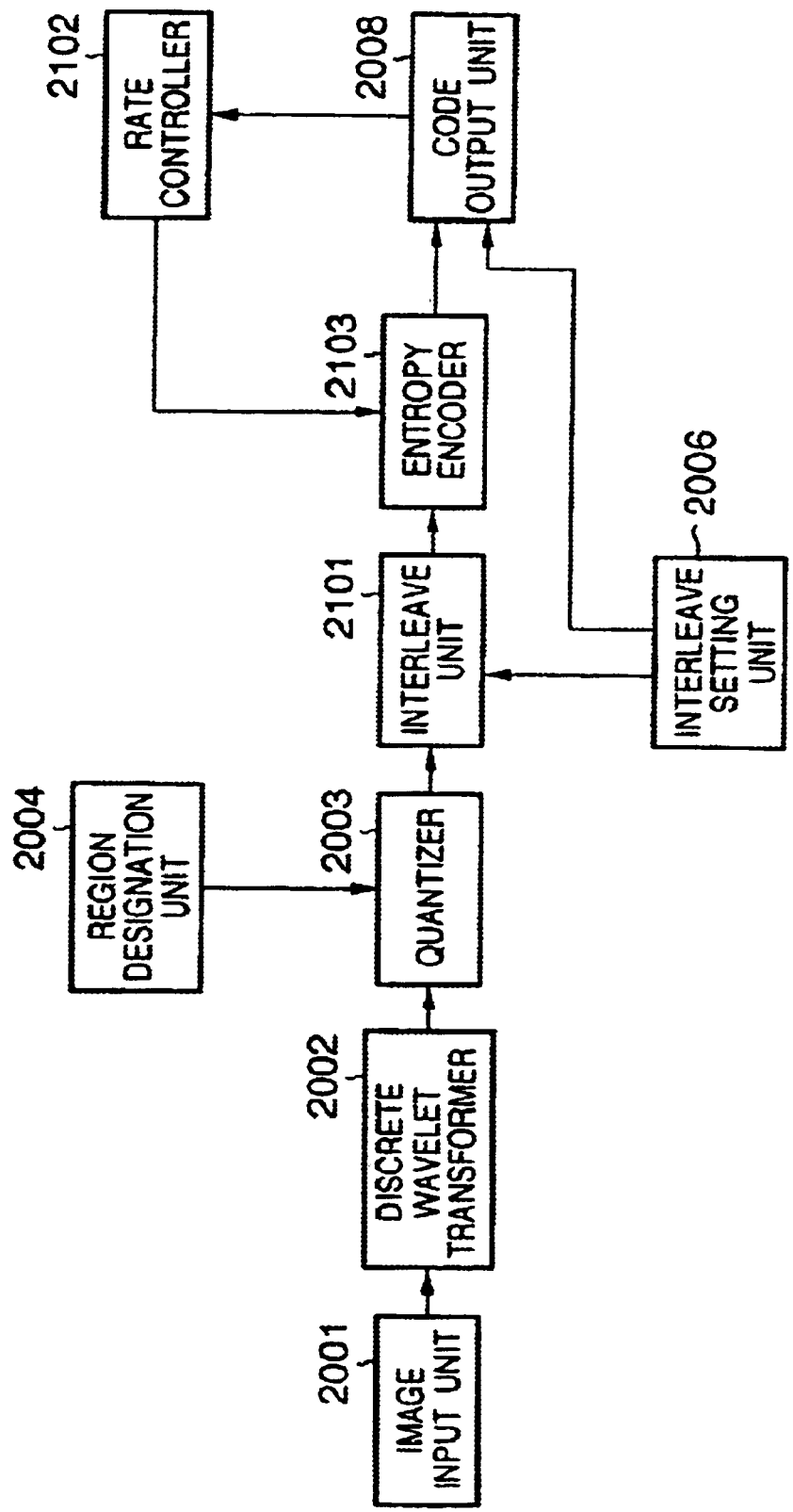
FIG. 11 is a block diagram showing an arrangement of an image processing apparatus according to the third embodiment of the present invention.

FIG. 11 is a block diagram showing the arrangement of an image processing apparatus of this embodiment.

Note that this embodiment will exemplify an image encoding apparatus that implements intra-frame coding which independently encodes frames. The same reference numerals in FIG. 11 denote the same building components as those in the first embodiment, and a detailed description thereof will be omitted.

Referring to FIG. 11, reference numeral 2101 denotes an interleave unit which selects a bit plane in accordance with an instruction from the interleave setting unit 2006. Reference numeral 2102 denotes a rate controller for controlling the information size of each frame. Reference numeral 2103 denotes an entropy encoder which can abort encoding in response to an encoding abort instruction from the rate controller 2102.

In this embodiment, the image input unit 2001 inputs moving image data in units of frames. The discrete wavelet transformer 2002, quantizer 2003, and region designation unit 2004 perform the same operation as in the first embodiment. That is, the input image data have undergone discrete wavelet transformation, the designated ROI is bit-shifted to the MSB side, and "0" is filled in blanks formed by the bit shift process. The interleave setting unit 2006 outputs the output order in accordance with Table 1 as in the first embodiment.

The interleave unit 2101 selects bit planes from the quantized data in the output order in accordance with an instruction from the interleave setting unit 2006, and inputs them to the entropy encoder 2103. The entropy encoder 2103 makes binary arithmetic coding of input bit planes, and outputs code streams to the code output unit 2008 unless it receives an encoding abort instruction from the rate controller 2102. The code output unit 2008 shapes the generated data in accordance with a given format to output final encoded data.

Figure 21:
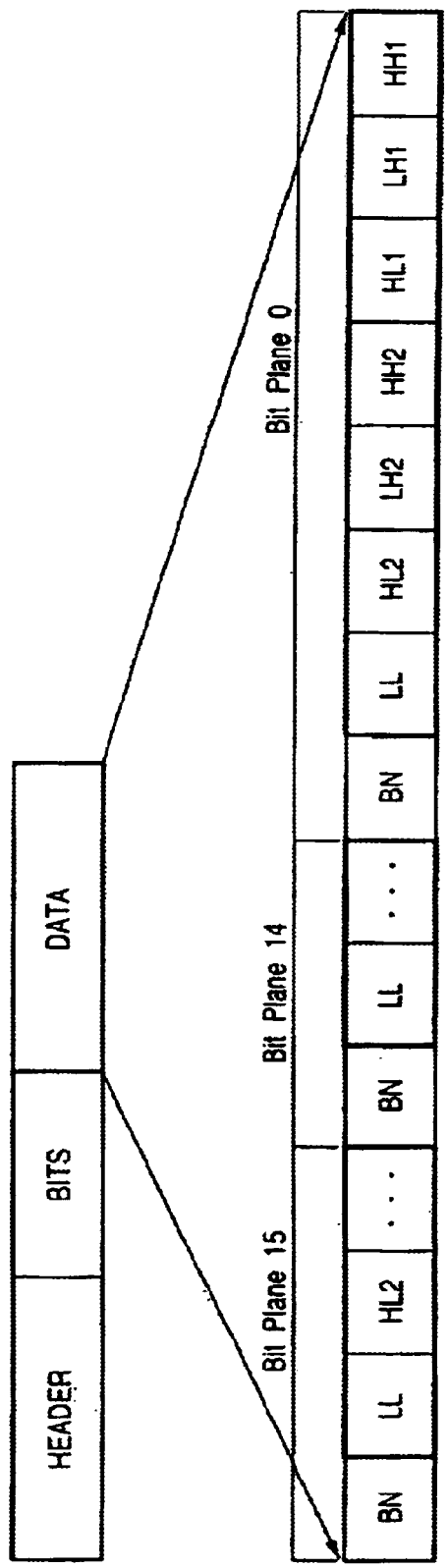
FIG. 21 shows the format of encoded data according to the third embodiment of the present invention.

The format of the encoded data will be explained below using FIG. 21.

Shaping of encoded data will be explained below with reference to FIG. 21. The code output unit 2008 outputs a header obtained by encoding an image size, and the like first. Subsequently, the code output unit 2008 outputs a BITS code which indicates the number of bits per pixel of image data. In this embodiment, nonzero portions within the range from the 8th to 16th bits are defined as an ROI, and no mask information is transported since the same effect can be obtained if it is not transported. After that, encoded data of respective bit planes follow.

The shaping sequence of encoded data will be explained. A BN code indicating the bit plane number is output first. In case of Table 1, a BN code of bit plane number "15" is output. Subsequently, the code streams of subbands of bit plane number "15" encoded by the entropy encoder 2103 are output in the order of LL, HL2, LH2, HH2, HL1, LH1, and HH1. Then, a BN code of bit plane number "14" and the code streams of subbands of bit plane number "14" are output. After that, BN codes of bit plane numbers "13", "12", "07", "06", "11", "10", "09", "05", "04", "08", "03", "02", and "01" and corresponding code streams follow, and a BN code of bit plane number "00" and corresponding code stream are output finally. When the rate controller 2102 instructs the entropy encoder 2103 to abort encoding, output of encoded data of a frame at that time is terminated, and entropy encoder 2103 prepares for output of encoded data of the next frame.

The rate controller 2102 computes a code size that can be assigned to one frame on the basis of the frame rate of input image data and a target bit rate of encoding. The rate controller 2102 sums up the code sizes output from the code output unit 2008. When the target bit rate per frame is about to exceed, the rate controller 2102 instructs the entropy encoder 2103 to abort encoding.

As described above, according to this embodiment, the rate control of a moving image can be easily and accurately made. Since the interleave unit 2101 interleaves on the basis of information input from the interleave setting unit 2006, encoded data that can be satisfactorily transported not only the ROI but also the surrounding regions can be generated even when the rate lowers.

In the above description, the shift-up amount of the ROI is set at 8 bits. Alternatively, the maximum number of bits of the quantization results may be used.

[Fourth Embodiment]

Figure 22:
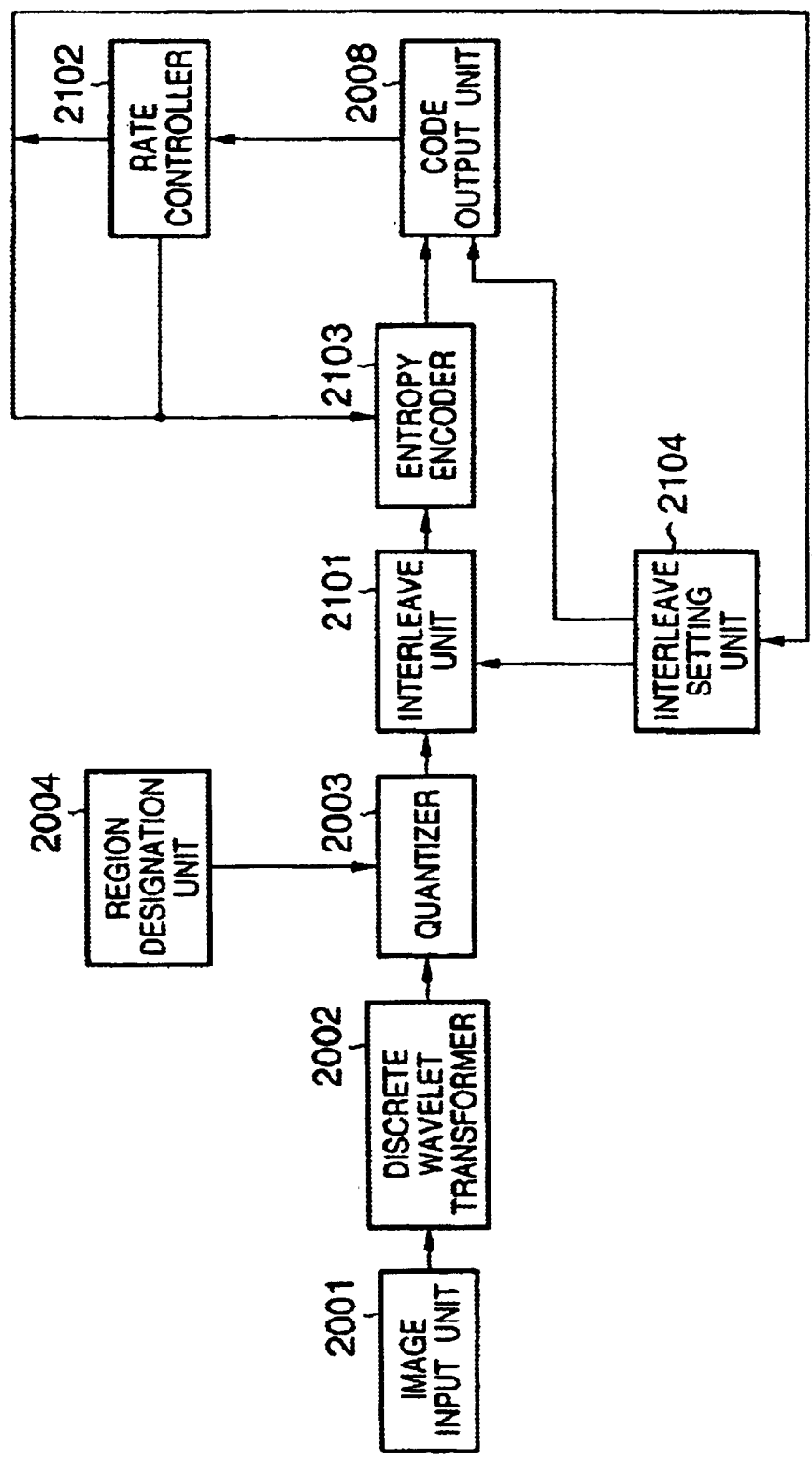
FIG. 22 is a block diagram showing an arrangement of an image processing apparatus according to the fourth embodiment of the present invention.

FIG. 22 is a block diagram showing the arrangement of an image processing apparatus according to this embodiment.

Note that this embodiment will exemplify an image encoding apparatus that implements intra-frame coding which independently encodes frames as in the third embodiment. Also, the same reference numerals in FIG. 22 denote the same building components as those in the first and third embodiments, and a detailed description thereof will be omitted.

Referring to FIG. 22, reference numeral 2104 denotes an interleave setting unit.

In this embodiment, the image input unit 2001, discrete wavelet transformer 2002, quantizer 2003, and region designation unit 2004 perform the same operation as in the third embodiment. That is, the input image data undergoes discrete wavelet transformation, the designated ROI is bit-shifted to the MSB side, and "0" is filled in blanks formed by the bit shift process. The interleave setting unit 2104 receives an encoding bit rate from the rate controller 2102, and selects one of Table 1 or Table 2 below.

TABLE 2

| Output Order | Bit Plane Number |
|---|---|
| 1 | 15 |
| 2 | 14 |
| 3 | 07 |
| 4 | 13 |
| 5 | 12 |
| 6 | 06 |
| 7 | 11 |
| 8 | 10 |
| 9 | 05 |
| 10 | 09 |
| 11 | 08 |
| 12 | 04 |
| 13 | 03 |
| 14 | 02 |
| 15 | 01 |
| 16 | 00 |

In this embodiment, when a low bit rate is set, the interleave setting unit 2104 selects and outputs the output order of Table 2; when a high bit rate is set, the unit 2104 selects and outputs that of Table 1.

As in the third embodiment, the interleave unit 2101 selects bit planes from the quantized data in the output order and inputs them to the entropy encoder 2103 in accordance with an instruction from the interleave setting unit 2104. The entropy encoder 2103 performs binary arithmetic coding of input bit planes, and outputs code streams to the code output unit 2008 unless it receives an encoding abort instruction from the rate controller 2102. The code output unit 2008 shapes the generated data in accordance with a given format to output encoded data.

As described above, according to this embodiment, the rate control of a moving image can be easily and accurately made. Since the interleave unit 2101 switches an interleave method in accordance with bit rate based on information input from the interleave setting unit 2004, encoded data that can be satisfactorily transported not only the ROI but also the surrounding regions can be generated even when the rate lowers.

[Fifth Embodiment]

Figure 6:
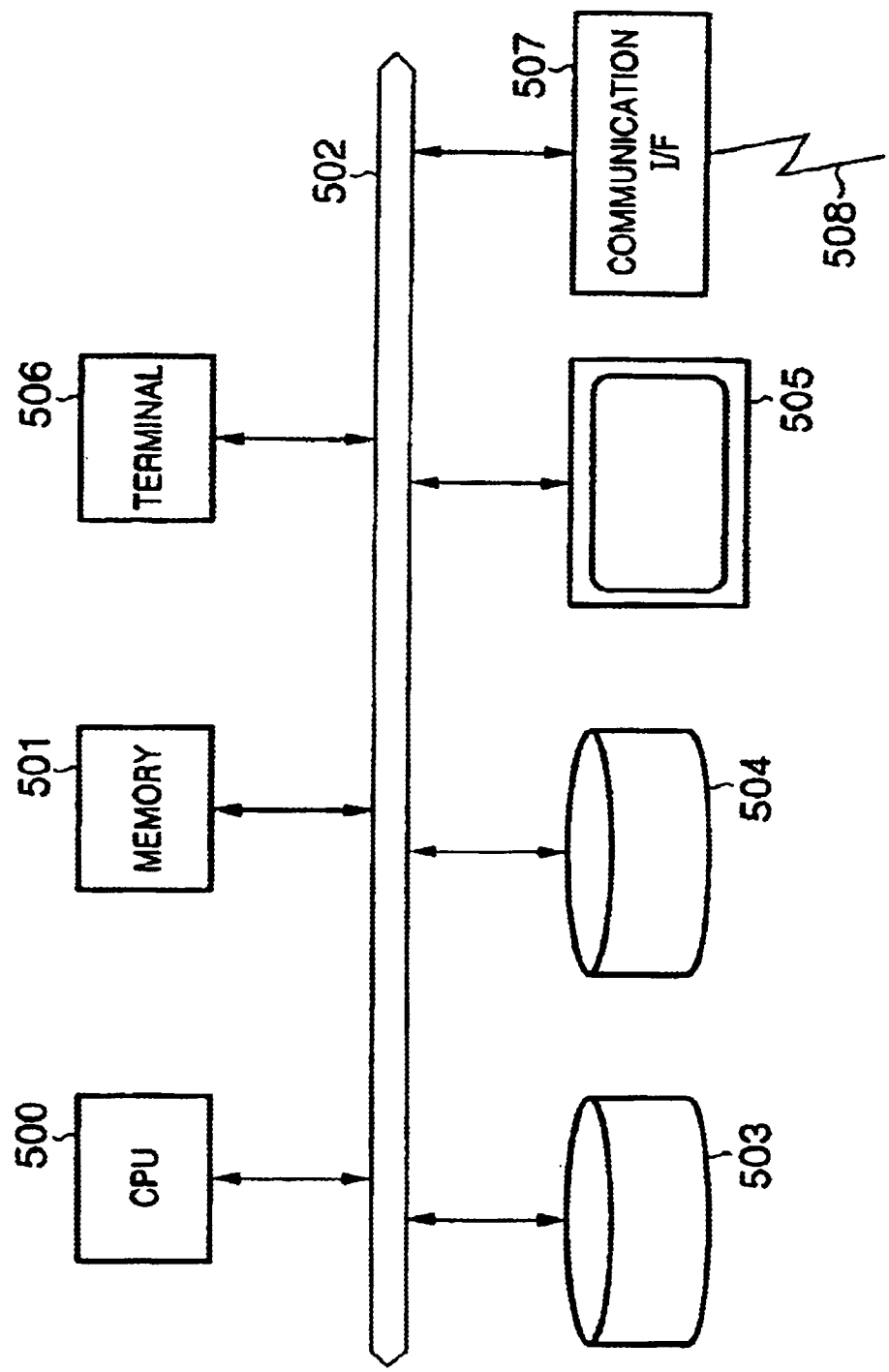
FIG. 6 is a block diagram showing an arrangement of a computer in the fifth and sixth embodiments of the present invention.

FIG. 6 is a block diagram showing an arrangement of an image processing apparatus according to an embodiment of the present invention.

Note that this embodiment will exemplify an image encoding apparatus that encodes a still image as in the first embodiment.

Referring to FIG. 6, reference numeral 500 denotes a central processing unit (CPU) for controlling the overall image processing apparatus and making various processes. Reference numeral 501 denotes a memory which stores an operating system (OS) and software required for controlling the image processing apparatus of this embodiment, and provides storage areas required for arithmetic operations. The memory 501 has an image area which stores the OS that controls the overall image processing apparatus and makes various kinds of software run, and software to run, image area which is used to load image data to be encoded, a code area which temporarily stores code data, and a working area which stores parameters of various arithmetic operations and the like.

Reference numeral 502 denotes a bus for interconnecting various components that build up the image processing apparatus, and exchanging data and control signals. Reference numeral 503 denotes a storage device for storing software; and 504, a storage device for storing moving image data. Reference numeral 505 denotes a monitor for displaying an image. Reference numeral 508 denotes a communication line which comprises a LAN, public line, radio line, broadcast wave, or the like. Reference numeral 507 denotes a communication interface (I/F) for transmitting encoded data onto the communication line 508. Reference numeral 506 denotes a terminal which is used to start up the image processing apparatus, set various conditions such as a bit rate and the like, and so forth.

In this arrangement, prior to a process, the user selects moving image data to be encoded from those stored in the storage device 504 and instructs to start the image processing apparatus at the terminal 506. In response to this instruction, software stored in the storage device 503 is mapped in the program area of the memory 501 via the bus 502 and is launched.

The encoding operation of moving image data stored in the storage device 504 by the CPU 500 will be explained below using FIG. 23.

Figure 23:
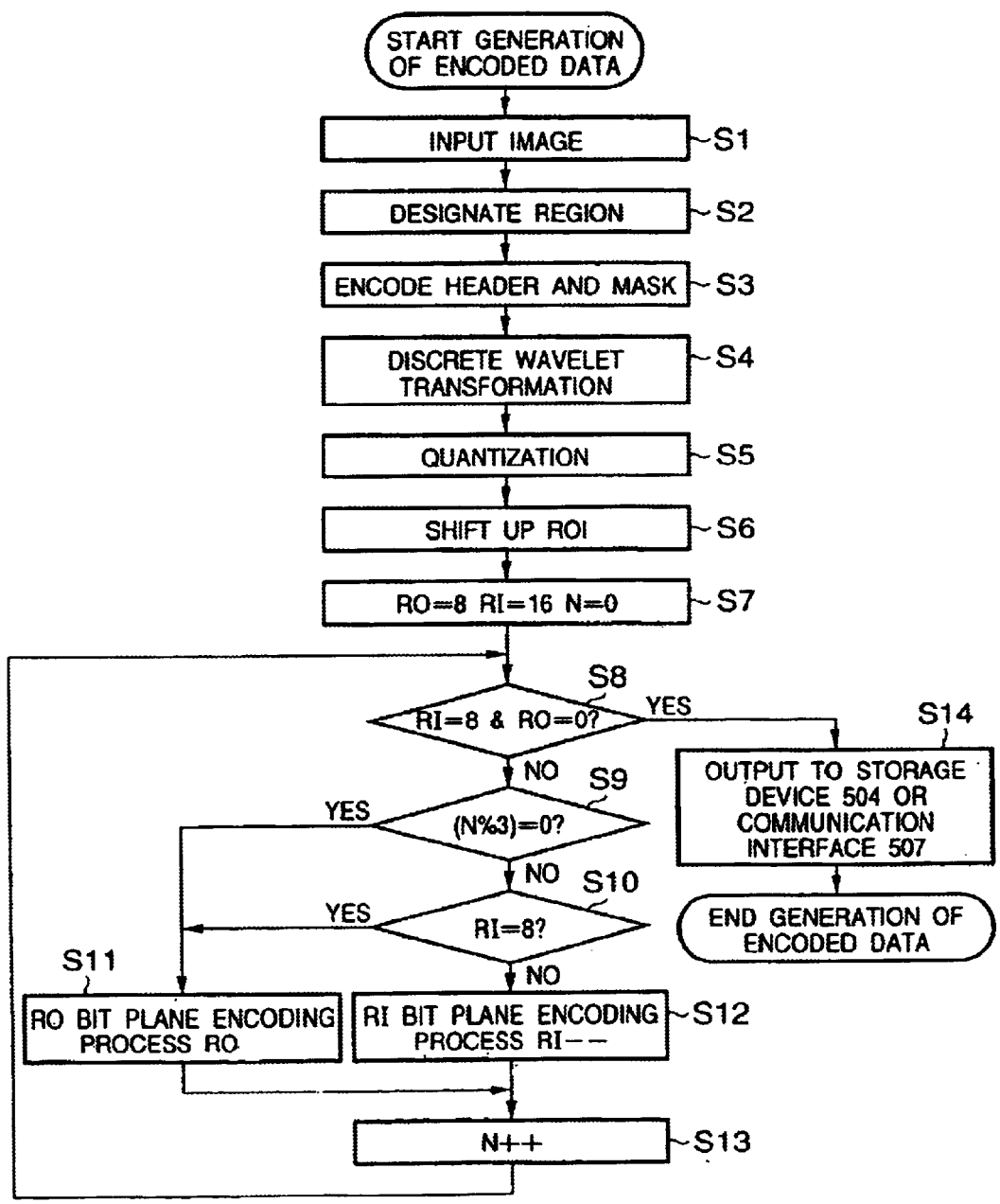
FIG. 23 is a flow chart showing an encoding operation according to the fifth embodiment of the present invention.

FIG. 23 is a flow chart showing the encoding operation of this embodiment.

In step S1, image data selected at the terminal 506 is read out from the storage device 504, and is stored in the image area of the memory 501. The user determines an ROI at the terminal 506, and its region information is stored in the working area of the memory 501 in step S2. In step S3, a header and BITS code shown in FIG. 8 are generated, and are stored in the code area of the memory 501. Furthermore, the region information of the ROI is read out from the working area and is encoded as mask information, which is stored in the code area.

In step S4, the image data stored in the image area of the memory 501 undergoes discrete wavelet transformation to acquire transform coefficients. In step S5, the acquired transform coefficients are quantized, and the quantization results are stored in the image area. In step S6, the quantization results of the ROI are shifted to the MSB side by 8 bits, and "0" is filled in the lower 8 bits of the ROI and upper 8 bits of non-ROI portions, thus generating 16-bit data as a whole.

In step S7, variables RO, RI, and N used in the subsequent loop are initialized. RO sets the MSB value of an effective bit plane outside the ROI, and RI sets the MSB value of an effective bit plane inside the ROI. RO is set at "8" since the non-ROI region is originally specified by 8 bits, and RI is set at "16" since bits of the ROI are shifted to the MSB side by 8 bits. Also, "0" is set in variable N to be counted up.

It is checked in step S8 if the process for all the bit planes is complete, i.e., RI=8 and RO=0. If RI=8 and RO=0 (YES in step S8), the flow advances to step S14 to store the contents of the code memory of the memory 501 in the storage device 504, thus ending the processing. Alternatively, in step S14 the contents of the code memory may be output onto the communication line 508 via the communication interface 507.

If RI≠8 and RO≠0 (NO in step S8), the flow advances to step S9. It is checked in step S9 if the remainder obtained upon dividing the contents of variable N by 3 is "0". If the remainder is not "0" (NO in step S9), the flow advances to step S10. On the other hand, if the remainder is "0" (YES in step S9), the flow advances to step S11.

It is checked in step S10 if RI=8. If RI=8 (YES in step S10), since encoding of the ROI is complete, the flow advances to step S11 to encode the non-ROI region. In step S11, the value RO is encoded and stored in the code area of the memory 501. Subsequently, a bit plane indicated by the value RO is encoded by binary arithmetic coding, and generated encoded data is stored in the code area of the memory 501. After that, the value RO is decremented by 1, and the flow advances to step S13.

If RI≠8 (NO in step S10), the flow advances to step S12 to encode the ROI. In step S12, the value RI is encoded and stored in the code area of the memory 501. Subsequently, a bit plane indicated by the value RI is encoded by binary arithmetic coding, and generated encoded data is stored in the code area of the memory 501. After that, the value RI is decremented by 1, and the flow advances to step S13.

In step S13, the contents of variable N are incremented by 1, and the flow returns to step S8.

As described above, according to this embodiment, encoded data that maintains good balance of image quality inside and outside the ROI can be generated.

In the above description, the ROI shift-up amount is 8 bits. Alternatively, the maximum number of bits of quantization results may be used.

[Sixth Embodiment]

The arrangement of the image processing apparatus of this embodiment is the same as that of the image processing apparatus of the fifth embodiment shown in FIG. 6. In this embodiment, a decoding process of encoded data which is generated by the fifth embodiment and is stored in the storage device 504 will be exemplified.

In FIG. 6, prior to a process, the user selects encoded data to be decoded from those stored in the storage device 504 and instructs to start up the image processing apparatus at the terminal 506. In response to this instruction, software stored in the storage device 503 is mapped in the program area of the memory 501 via the bus 502 and is launched.

The decoding operation of encoded data stored in the storage device 504 by the CPU 500 will be explained below using FIG. 24.

Figure 24:
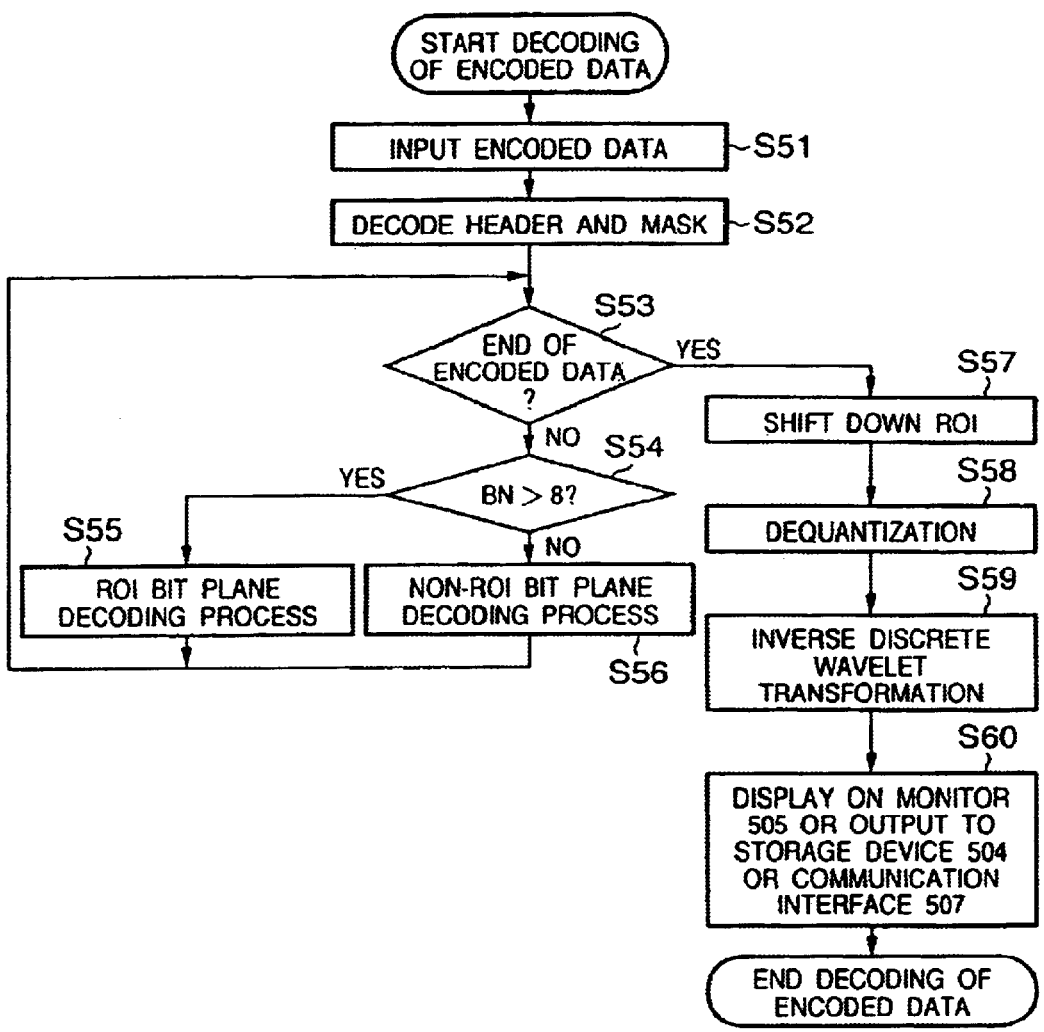
FIG. 24 is a flow chart showing a decoding operation according to the sixth embodiment of the present invention.

FIG. 24 is a flow chart showing the decoding operation of this embodiment.

In step S51, encoded data selected at the terminal 506 is read out from the storage device 504, and is stored in the code area of the memory 501. In step S52, a header and BITS code are obtained by decoding the encoded data stored in the code area of the memory 501, and are stored in the working area so that they can be used in the subsequent processes. Also, encoded data of mask information is decoded to reconstruct mask information, which is stored in the image area of the memory 501.

It is checked in step S53 if decoding of all the input encoded data is complete or a decoding abort instruction is input at the terminal 506. If decoding of all the input encoded data is complete or a decoding abort instruction is input (YES in step S53), the flow advances to step S57. On the other hand, if decoding of all the input encoded data is not complete yet or a decoding abort instruction is not input (NO in step S53), the flow advances to step S54.

In step S54, encoded data stored in the code area of the memory 501 are read out in turn to decode a BN code, and it is checked if the BN code value is larger than 8. If the value is larger than 8 (YES in step S54), the flow advances to step S55 to decode the ROI. In step S55, the input bit plane (inside the ROI) is decoded, and is stored in a bit plane in the image area of the memory 501 indicated by the BN code value. The flow then returns to step S53 to process the next bit plane.

On the other hand, if the value is equal to or smaller than 8 (NO in step S54), the flow advances to step S56. In step S56, the input bit plane (outside the ROI) is decoded, and is stored in a bit plane in the image area of the memory 501 indicated by the BN code value. The flow then returns to step S53 to process the next bit plane.

In step S57, it is determined that decoding in units of bit planes is complete, and bits of the ROI are shifted to the LSB in accordance with the mask information in the image area of the memory 501 and are stored in the image area. In step S58, quantization indices in the image area are dequantized, and the obtained transform coefficients are stored in the image area. In step S59, the transform coefficients in the image area undergo inverse discrete wavelet transformation to generate image data, which is stored in the image area of the memory 501. In step S60, the reclaimed image is displayed on the monitor 505, is stored in the storage device 504, or is output onto the communication line 508 via the communication interface 507, thus ending the processing.

As described above, according to this embodiment, an image can be reclaimed while maintaining good balance of image quality inside and outside the ROI.

In the above description, the ROI shift-up amount is 8 bits. Alternatively, the maximum number of bits of quantization results may be used.

In the above embodiments, the output orders shown in Tables 1 and 2, i.e., the orders the bit planes are to be interleaved are not limited to those, and may be changed in units of frames of a moving image. Furthermore, if the order is fixed and is known at both the encoding and decoding sides, BN codes may be omitted.

[Seventh Embodiment]

Figure 1:
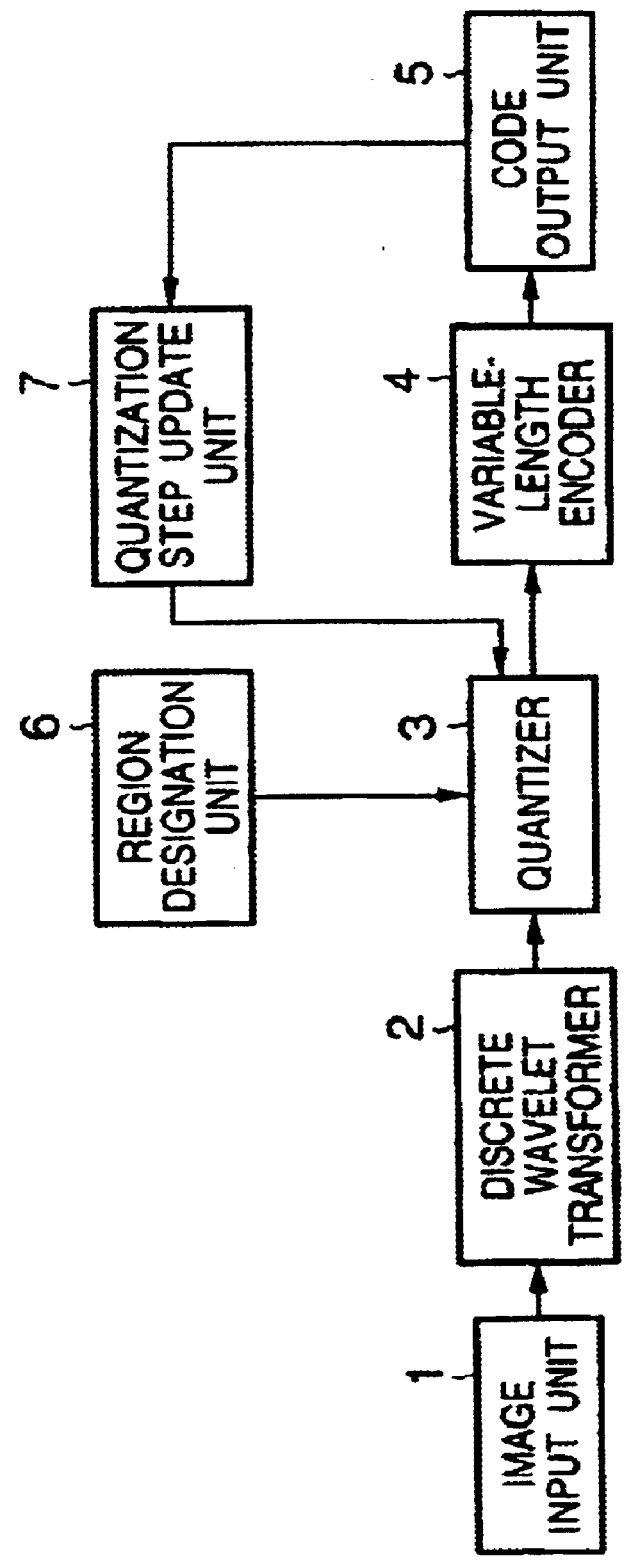
FIG. 1 is a block diagram showing an arrangement of an image encoding apparatus according to the seventh embodiment of the present invention.

This embodiment will exemplify an image encoding apparatus. FIG. 1 is a block diagram showing the arrangement of an image encoding apparatus of this embodiment.

Reference numeral 1 denotes an image input unit for inputting an image to be encoded, breaking up the image into blocks, each having a predetermined size, and outputting image signals in units of blocks; 2, a discrete wavelet transformer for computing the discrete wavelet transforms of the image signals, and outputting transform coefficients as a result of computation; 3, a quantizer for quantizing the transform coefficients after discrete wavelet transformation, and generating and outputting quantization indices; 4, a variable-length encoder for encoding quantization indices to obtain a variable-length bitstream; and 5, a code output unit for outputting the bitstream. Reference numeral 6 denotes a region designation unit for designating a desired ROI in an image. Reference numeral 7 denotes a quantization step update unit for controlling the finally generated code size on the basis of the code size from the code output unit 5.

Figure 7:
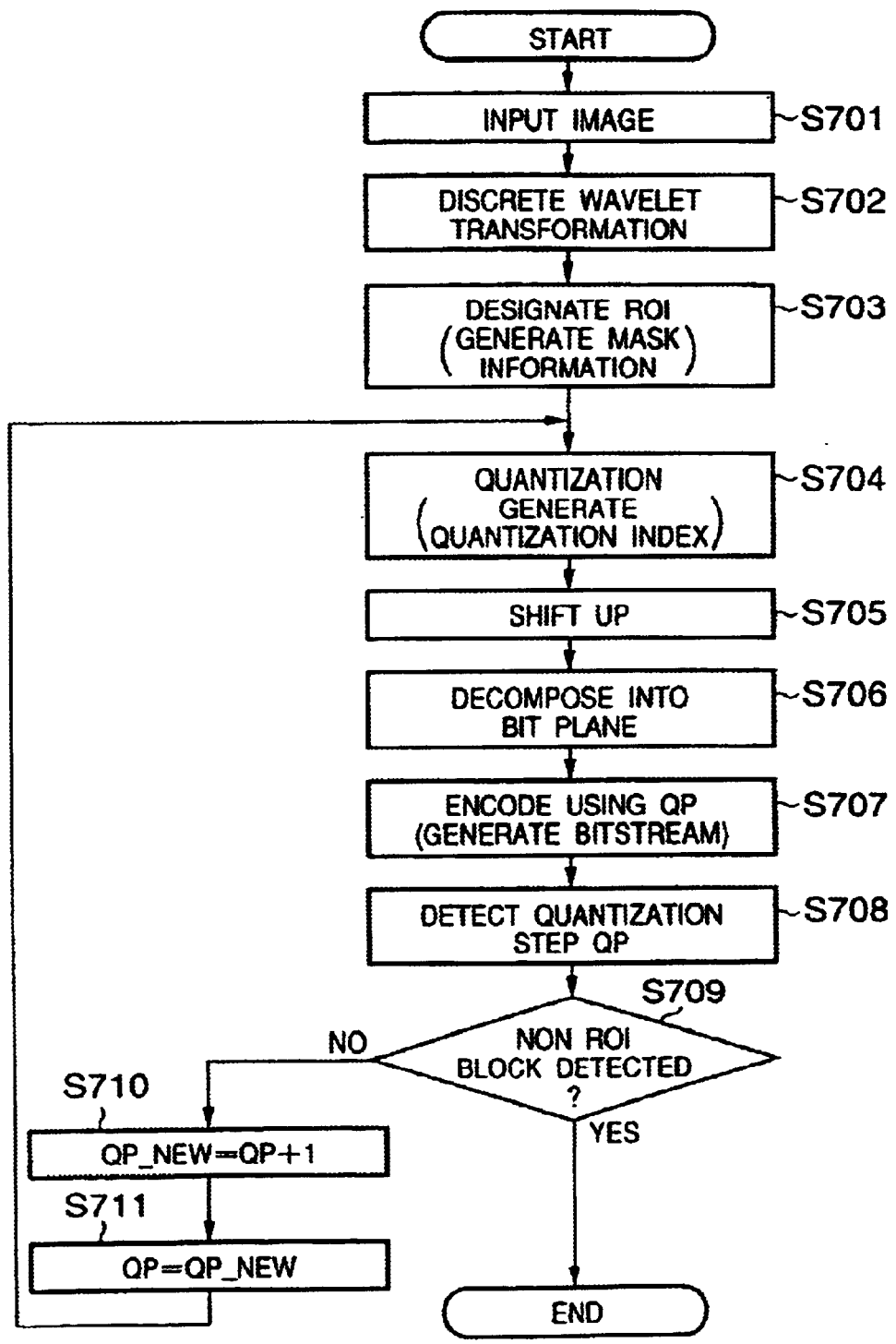
FIG. 7 is a flow chart showing an operation of the image encoding apparatus according to the seventh embodiment of the present invention.

FIG. 7 is a flow chart showing the operation of the image encoding apparatus of this embodiment with the aforementioned arrangement, and the operation of the image encoding apparatus will be described below using FIGS. 7 and 1.

An image to be encoded is input to the image input unit 1 in the raster scan order, and is broken up into blocks each having a predetermined size (step S701). Image signals in units of blocks are input to the discrete wavelet transformer 2.

The discrete wavelet transformer 2 executes a two-dimensional discrete wavelet transformation process of the input signals to compute transform coefficients (step S702). The transform coefficients are output to the quantizer 3.

The region designation unit 6 determines a region (ROI) to be decoded to have higher image quality than the surrounding portions in the image to be encoded, and generates mask information indicating transform coefficients that belong to the ROI upon computing the discrete wavelet transforms of this image (step S703). Bits that form the mask information have one-to-one correspondence with the transform coefficients; bits corresponding to transform coefficients that belong to the ROI are set at "1", and bits corresponding to transform coefficients that do not belong to the ROI are set at "0". Furthermore, portions of respective subbands including the ROI upon computing the wavelet transforms of the image including the ROI are computed. The mask information is encoded by the variable-length encoder 4, and the encoded information is sent to the code output unit 5.

The quantizer 3 quantizes the input transform coefficients by a predetermined quantization step QP, and outputs indices (quantization indices) corresponding to the quantized values (step S704). The quantizer 3 changes quantization indices using equations (1) and (2) on the basis of the mask information input from the region designation unit 6. That is, only quantization indices that belong to the ROI are shifted to the MSB side by W (W=8 in equations (1) and (2)) bits (step S705).

Figure 2B:
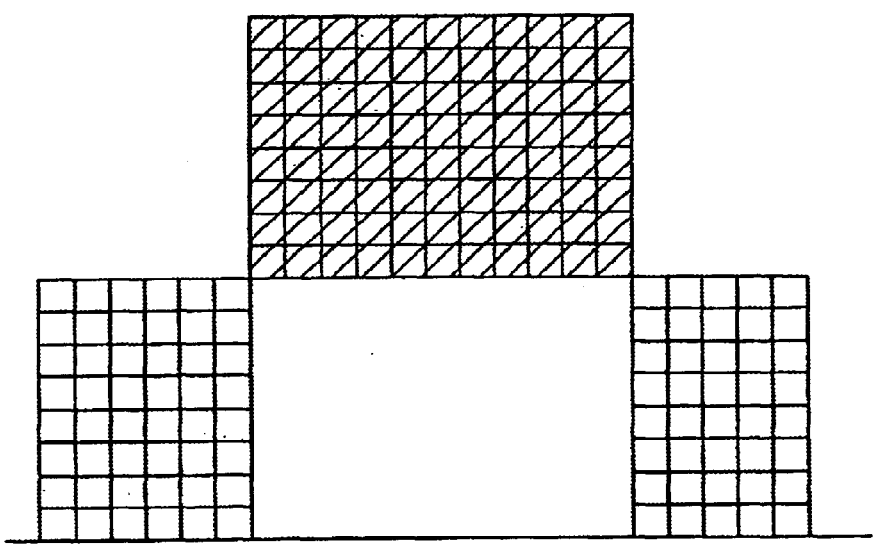
Figure 2C:
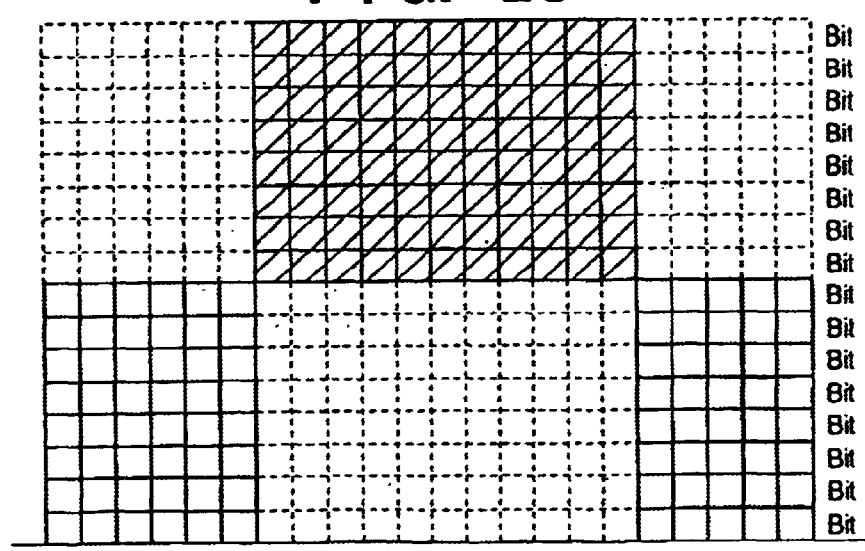

FIGS. 2A to 2C show changes in quantization index by the quantizer 3 when W=8. FIG. 2A shows source quantization indices, and the central hatched portion indicates the ROI. In FIG. 2B, the ROI is shifted to the MSB side by 8 bits. Furthermore, the dotted frame boxes in FIG. 2C are filled with "0". The most significant bit plane number is "15", and the least significant bit plane number is "00". The changed quantization indices are output to the variable-length encoder 4, and are also stored in a RAM (not shown).

The variable-length encoder 4 decomposes the input quantization indices into a plurality of bit planes by the same method as in the prior art (step S706), executes binary arithmetic coding in units of bit planes, and outputs bit-streams (code streams) in units of bit planes (step S707).

The quantization step update unit 7 receives the bitstream from the code output unit 5, computes a new quantization step by a method to be described later, and outputs the new quantization step to the quantizer 3.

Figure 3:
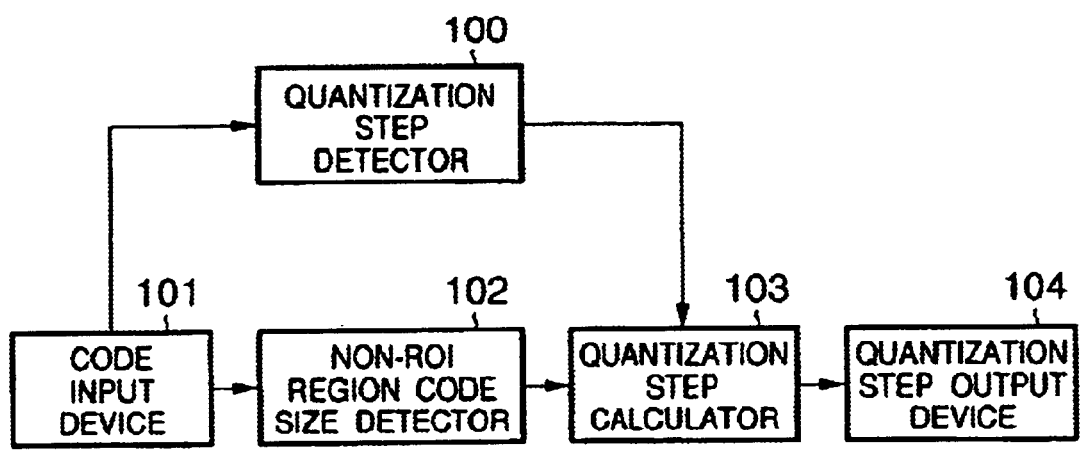
FIG. 3 is a block diagram showing an internal operation of a quantization step updating unit 7.

FIG. 3 shows a basic internal arrangement of the quantization step update unit 7.

After a bitstream is input from a code input device 101, a quantization step detector 100 detects the quantization step QP contained in that bitstream (step S708), and a non-ROI region code size detector 102 detects the presence/absence of blocks outside the ROI range of the input bitstream (step S709). Note that blocks are arranged linearly in advance, and are present in the order of blocks included in the ROI and those which are not included in the ROI. If the ROI overlaps a given block at a predetermined ratio or higher, it is determined that the block falls within the ROI range.

When the non-ROI region code size detector 102 detects a block outside the ROI range, it sends an instruction not to update the quantization step QP to a quantization step calculator 103. As a result, the quantization step update unit 7 outputs no signal, and the quantization step QP remains the same. On the other hand, when the non-ROI region code size detector 102 detects a block within the ROI range, it sends an instruction to update the quantization step QP to the quantization step calculator 103.

The quantization step calculator 103 updates the quantization step QP to a new quantization step QP_NEW (step S710), and outputs it to a quantization step output device 104. The relationship between the QP and QP_NEW is described by:

$$QP\_NEW = QP + 1 \quad (5)$$

QP_NEW is substituted in QP (step S711), and the flow returns to step S704 to encode the quantization indices stored in the RAM (not shown) again.

In this way, the quantization step update unit 7 repetitively updates the quantization step QP_NEW (QP) until the code output unit 5 receives a block outside the ROI range. This encoded result is associated with a non-ROI encoded result. Hence, since the interior of the ROI has undergone coarse quantization, an image with lower image quality than that quantized using the quantization step QP is obtained.

That is, by lowering the image quality of the ROI, the code size of the ROI is reduced, and the difference of the image quality of the non-ROI region is also reduced, thus eliminating any deviation of the image quality of the whole image.

Note that this embodiment uses discrete wavelet transformation as a transformation method (orthogonal transformation) of an image into the frequency domain, but other transformation methods may be used.

In this embodiment, the quantization step update unit 7 updates the quantization step QP_NEW by +1. Alternatively, the update amount may assume another value that satisfies QP<QP_NEW.

According to the image encoding apparatus and method of this embodiment, the code size of the ROI can be reduced, and any deviation of image quality between ROI and non-ROI images can be reduced.

Note that a program code according to the flow chart shown in FIG. 7 is stored in a ROM (not shown).

[Eighth Embodiment]

Figure 19:
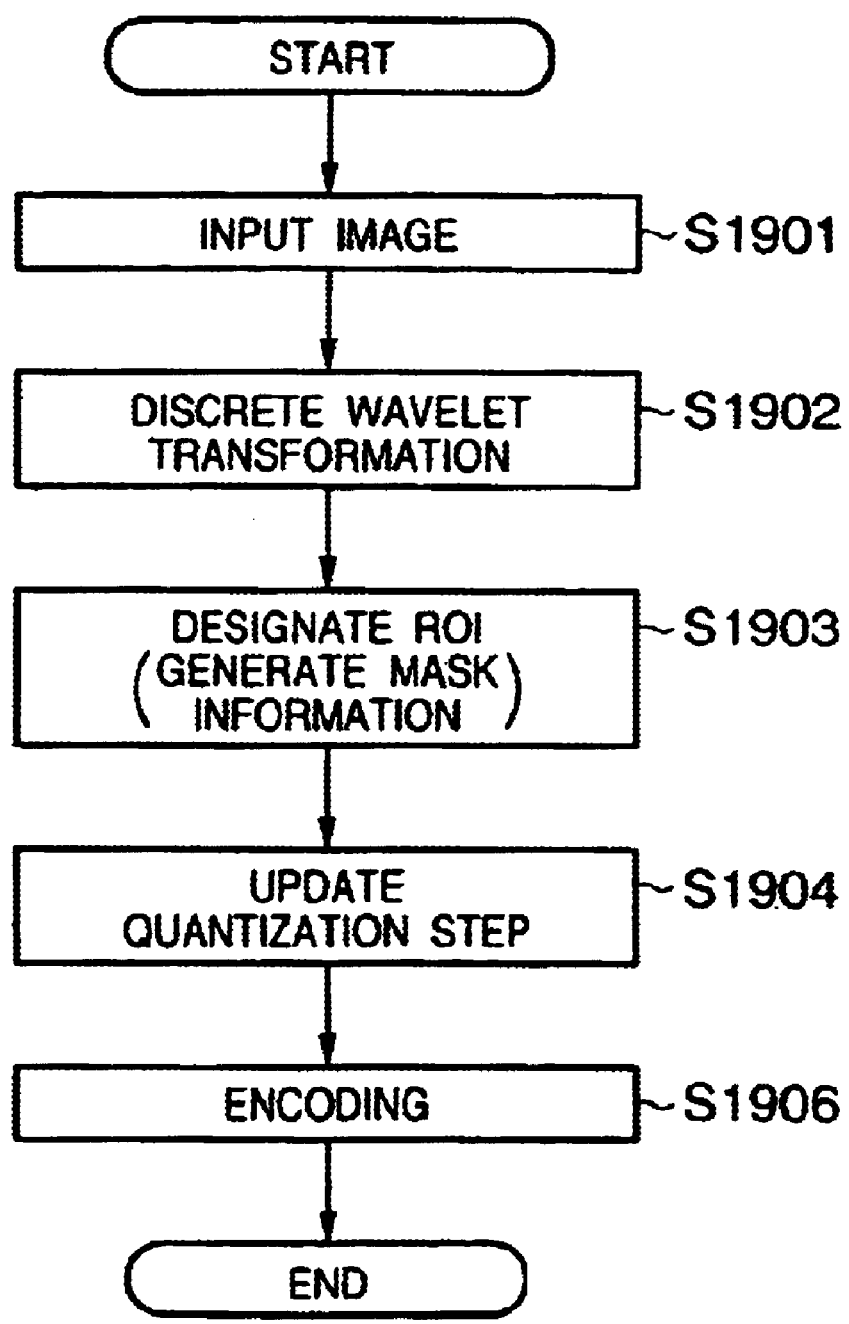
FIG. 19 is a flow chart showing an operation of the image encoding apparatus according to the eighth embodiment of the present invention.

In the seventh embodiment, the ROI is encoded in a plurality of processing steps. Alternatively, this embodiment will explain an image encoding apparatus and method which can encode the ROI in a single processing step by obtaining the quantization step in advance using the flow chart that shows the operation of the image encoding apparatus of this embodiment shown in FIG. 19. Note that steps S1901 to S1903 are the same as steps S701 to S703, and a description thereof will be omitted.

Figure 4:
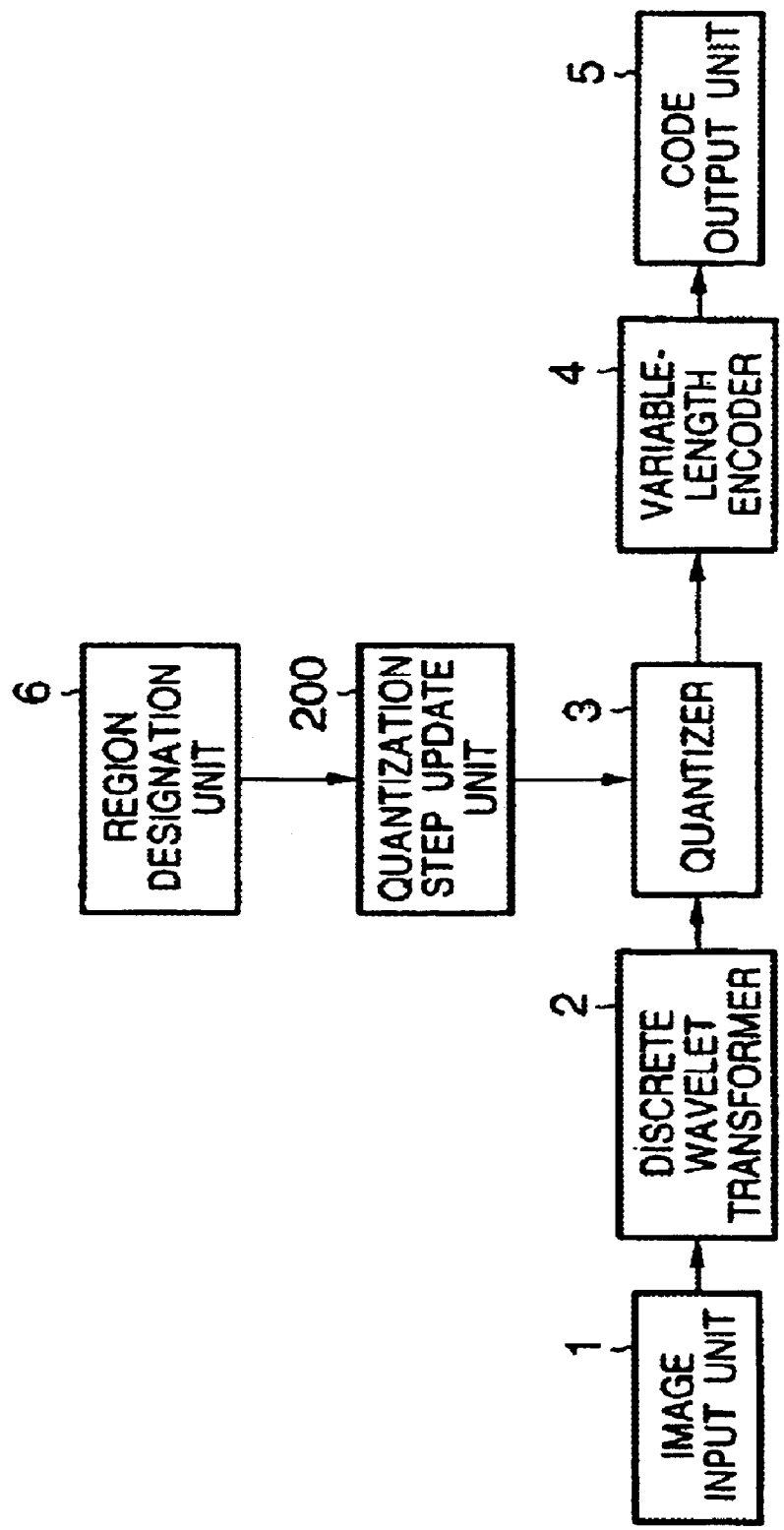
FIG. 4 is a block diagram showing an arrangement of an image encoding apparatus according to the eighth embodiment of the present invention.

FIG. 4 is a block diagram showing the arrangement of the image encoding apparatus of this embodiment.

The same reference numerals in FIG. 4 denote the same building components as in the seventh embodiment, and a detailed description thereof will be omitted.

Reference numeral 200 denotes a quantization step update unit for computing a quantization step for an image input to the image input unit 1 on the basis of the mask information of the ROI from the region designation unit 6.

In this arrangement, the quantization step update unit 200 obtains the area in the ROI on the basis of the mask information of the ROI from the region designation unit 6, and computes a quantization step in accordance with the ratio between the ROI area and the area of the overall image.

Figure 5:
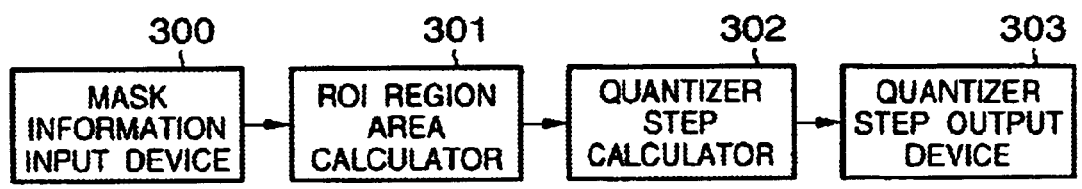
FIG. 5 is a block diagram showing an internal operation of a quantization step updating unit 200.

FIG. 5 shows the internal operation of the quantization step update unit 200.

An ROI region area calculator 301 calculates the aforementioned area ratio on the basis of the mask information from the region designation unit 6, which is input to a mask information input device 300. The area ratio is given by:

ROI area/area of entire image=A

A quantization step calculator 302 updates the predetermined quantization step QP to a new quantization step QP_NEW (step S1904), and the new quantization step is output by a quantization step output device 303. The relationship between QP and QP_NEW is described by:

$$QP\_NEW = QP \times (1+A)$$

The subsequent quantization and encoding processes are done using that quantization step QP_NEW (step S1906).

With a series of selection operations mentioned above, although coarse quantization is made as a whole using the area ratio A and updated quantization step QP_NEW, the code size of the ROI is consequently reduced, and any deviation of the image quality between the ROI and non-ROI image can be reduced.

Note that this embodiment uses discrete wavelet transformation as a transformation method (orthogonal transformation) of an image into the frequency domain, but other transformation methods may be used.

Furthermore, in this embodiment, the area ratio used in the quantization step update unit 200 may include a given multiplier, and the relation of QP and QP_NEW may be described by other relations as long as QP_NEW>QP holds.

As described above, according to the image encoding apparatus and method of this embodiment, since the quantization step is computed in advance in accordance with the area of the ROI, and encoding is done using that quantization step, the ROI can be encoded in a single processing step.

[Other Embodiments]

Note that the present invention may be applied to either a system constituted by a plurality of devices (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program code of a software program that can implement the functions of the above-mentioned embodiments to the system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

When the present invention is applied to the storage medium, that storage medium stores program codes corresponding to the flow charts shown in FIGS. 7, 19, 23, and 24 mentioned above.

To restate, according to the present invention, an image processing apparatus and method that can satisfactorily encode/decode both the ROI and non-ROI regions, and a computer readable memory can be provided.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus for encoding image data indicating an image including a first region and a second region, comprising:

an encoding unit, adapted to encode the image data at a first compression ratio to obtain first encoded image data, wherein the image data within the first region is encoded prior to the image data within the second region, said encoding unit terminating the encoding processing when a data amount of the first encoded image data exceeds a predetermined amount;

a detecting unit, adapted to detect whether or not the encoded data corresponding to the second region is included in the first encoded image data; and a control unit, adapted to make said encoding unit encode the image data at a second compression ratio higher than the first compression ratio to obtain second encoded image data, when the encoded data corresponding to the second region is not included in the first encoded image data, wherein said encoding unit is adapted to transform the image using discrete wavelet transformation, quantize the transformed image, bit-shift quantized data corresponding to the first region, so as to encode quantized data corresponding to the first region prior to quantized data corresponding to the second region, and encode code of each quantization index using entropy encoding.

2. The apparatus according to claim 1, wherein said detecting unit is adapted to detect whether or not the encoded data corresponding to the second region is included in the second encoded image data, and said control unit is adapted to make said encoding unit encode the image data at a third compression ratio higher than the second compression ratio to obtain third encoded image data when the encoded data corresponding to the second region is not included in the second encoded image data.

3. The apparatus according to claim 1, wherein the first and second encoded image data are generated using quantization processing, and the change of compression ratio is done by a changing quantization step used in the quantization processing.

4. The apparatus according to claim 1, wherein the first compression ratio is fixed when the encoded data corresponding to the second region is included in the first encoded image data.

5. The apparatus according to claim 1, wherein said detecting unit is adapted to detect whether or not encoded data indicating a block corresponding to the second region is included in the first encoded image data.

6. An image processing method encoding image data indicating an image including a first region and a second region, comprising:

an encoding step, of encoding the image data at a first compression ratio to obtain first encoded image data, in which the image data within the first region is encoded prior to the image data within the second region, said encoding step including terminating the encoding processing when a data amount of the first encoded image data exceeds a predetermined amount;

a detecting step, of detecting whether or not the encoded data corresponding to the second region is included in the first encoded image data; and a control step, of making said encoding step encode the image data at a second compression ratio higher than the first compression ratio to obtain second encoded image data, when the encoded data corresponding to the second region is not included in the first encoded image data, in which said encoding step includes a transforming the image using discrete wavelet transformation, quantizing the transformed image, bit-shifting quantized data corresponding to the first region, so as to encode quantized data corresponding to the first region prior to quantized data corresponding to the second region, and encoding code of each quantization index using entropy encoding.

7. A computer readable storage medium storing a program making a computer execute an image processing method of claim 6.

* * * * *

UNITED STATES PATENT AND TRADEMARK OFFICE
CERTIFICATE OF CORRECTION

PATENT NO. : 6,968,088 B2
DATED : November 22, 2005
INVENTOR(S) : Mitsuru Maeda et al.

It is certified that error appears in the above-identified patent and that said Letters Patent is hereby corrected as shown below:

<u>Column 8,</u>
Line 2, "corresponding" should read -- and corresponding --.

<u>Column 19,</u>
Line 4, delete "a".

Signed and Sealed this

Thirtieth Day of May, 2006

JON W. DUDAS
*Director of the United States Patent and Trademark Office*